(12) United States Patent
Kuchiki

(10) Patent No.: US 10,021,305 B2
(45) Date of Patent: Jul. 10, 2018

(54) IMAGE CAPTURE APPARATUS WITH PANNING ASSISTANCE FUNCTION AND CONTROL METHOD THEREOF

(71) Applicant: CANON KABUSHIKI KAISHA, Tokyo (JP)

(72) Inventor: Hiroaki Kuchiki, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 106 days.

(21) Appl. No.: 15/093,283

(22) Filed: Apr. 7, 2016

(65) Prior Publication Data
US 2016/0301871 A1 Oct. 13, 2016

(30) Foreign Application Priority Data

Apr. 9, 2015 (JP) .................. 2015-080346

(51) Int. Cl.
*H04N 5/232* (2006.01)

(52) U.S. Cl.
CPC ..... *H04N 5/23261* (2013.01); *H04N 5/23254* (2013.01); *H04N 5/23258* (2013.01); *H04N 5/23287* (2013.01)

(58) Field of Classification Search
CPC ................ H04N 5/23261; H04N 5/23254
See application file for complete search history.

(56) References Cited

U.S. PATENT DOCUMENTS

| | | | | |
|---|---|---|---|---|
| 5,467,127 A * | 11/1995 | Jong-Pil | ................ | G01S 3/7864 348/169 |
| 8,848,979 B2 * | 9/2014 | Ishikawa | ................ | H04N 7/183 348/169 |
| 9,319,587 B2 * | 4/2016 | Takao | ................ | H04N 5/23274 |
| 9,609,220 B2 * | 3/2017 | Ishii | ................ | H04N 5/2354 |
| 9,723,209 B2 * | 8/2017 | Takayanagi | ........ | H04N 5/23261 |
| 9,733,729 B2 * | 8/2017 | Aujay | ................ | G06F 3/0346 |
| 2007/0064809 A1 * | 3/2007 | Watanabe | ............ | H04N 19/159 375/240.16 |
| 2009/0219415 A1 * | 9/2009 | Matsunaga | ............ | H04N 5/272 348/239 |
| 2009/0295926 A1 * | 12/2009 | Miyazaki | ........... | H04N 5/23219 348/169 |
| 2011/0109755 A1 * | 5/2011 | Joshi | .................. | H04N 5/23248 348/208.5 |
| 2014/0036101 A1 * | 2/2014 | Imanishi | ............ | H04N 5/23258 348/208.5 |
| 2014/0063279 A1 * | 3/2014 | Ogura | ................ | H04N 5/23209 348/222.1 |
| 2014/0176437 A1 * | 6/2014 | Aujay | ................ | H04M 1/72544 345/158 |

(Continued)

FOREIGN PATENT DOCUMENTS

| | | |
|---|---|---|
| JP | 2006-317848 A | 11/2006 |
| JP | 2009-267834 A | 11/2009 |

*Primary Examiner* — Cynthia Segura

(74) *Attorney, Agent, or Firm* — Cowan, Liebowitz & Latman, P.C.

(57) ABSTRACT

An angular velocity of an image capture apparatus and a motion vector between images are detected. An object velocity is computed based on a comparison between a change amount of the angular velocities and a change amount of the motion vectors. Then, by changing an optical axis based on the object velocity during exposure, a panning assistance function capable of dealing with various panning operations can be provided.

15 Claims, 16 Drawing Sheets

(56) References Cited

U.S. PATENT DOCUMENTS

| | | | |
|---|---|---|---|
| 2014/0184834 A1* | 7/2014 | Miyasako | H04N 5/23254 |
| | | | 348/208.1 |
| 2015/0003676 A1* | 1/2015 | Kuchiki | G06T 7/2053 |
| | | | 382/103 |
| 2015/0022712 A1* | 1/2015 | Koishi | G02B 7/28 |
| | | | 348/352 |
| 2015/0130955 A1* | 5/2015 | Misawa | G03B 13/18 |
| | | | 348/208.5 |
| 2015/0227806 A1* | 8/2015 | Oami | G06K 9/00221 |
| | | | 348/222.1 |
| 2015/0373282 A1* | 12/2015 | Ishii | H04N 5/2354 |
| | | | 348/239 |
| 2016/0011004 A1* | 1/2016 | Matsumoto | G01C 21/16 |
| | | | 702/96 |
| 2016/0165139 A1* | 6/2016 | Takayanagi | H04N 5/23261 |
| | | | 348/208.4 |
| 2017/0134659 A1* | 5/2017 | Miyahara | H04N 5/23251 |
| 2017/0163997 A1* | 6/2017 | Haruna | H04N 19/167 |

* cited by examiner

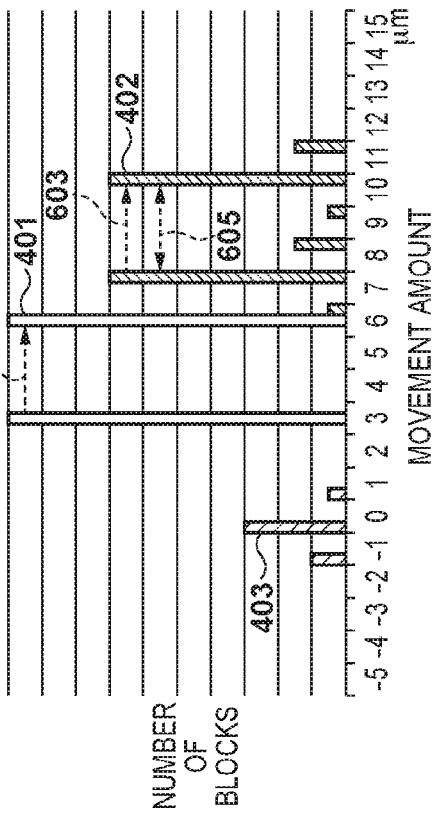
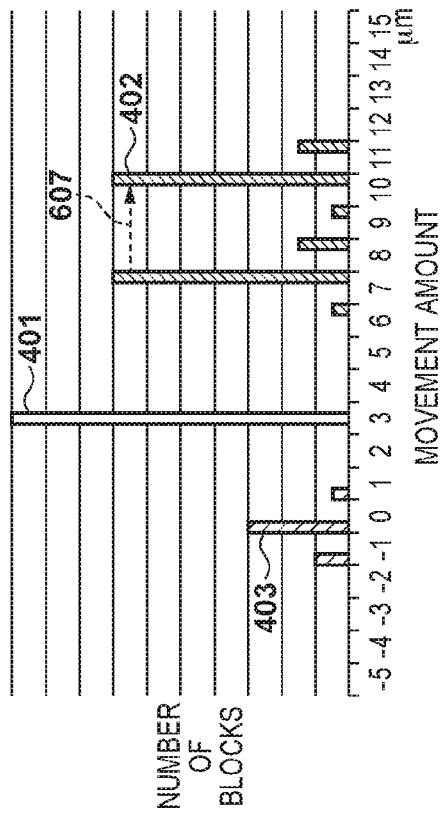
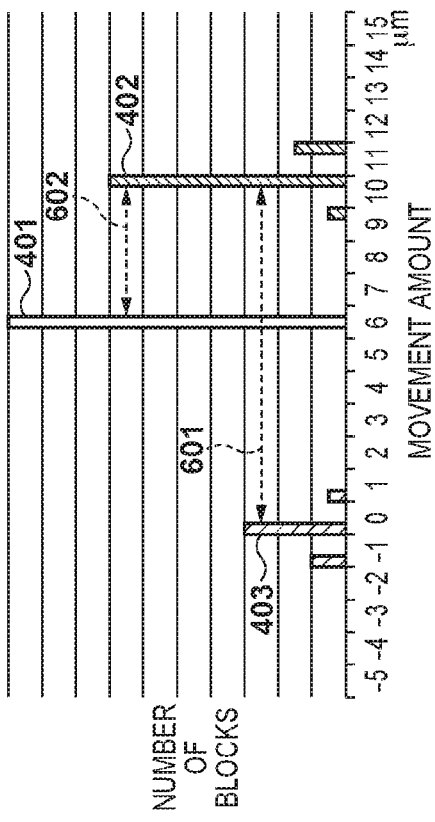
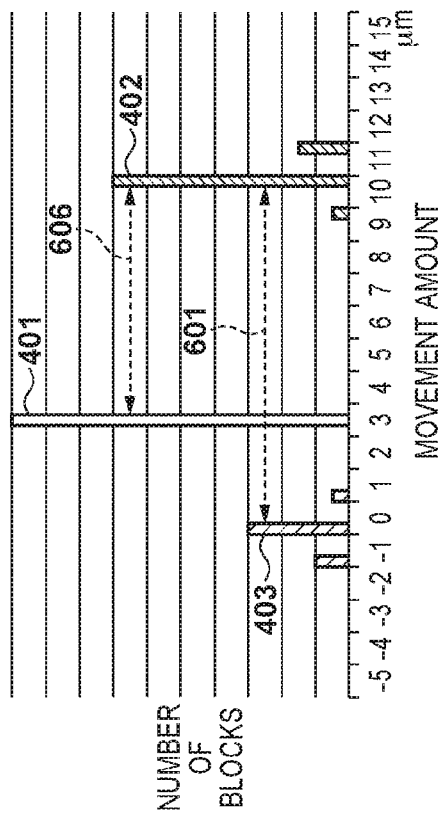

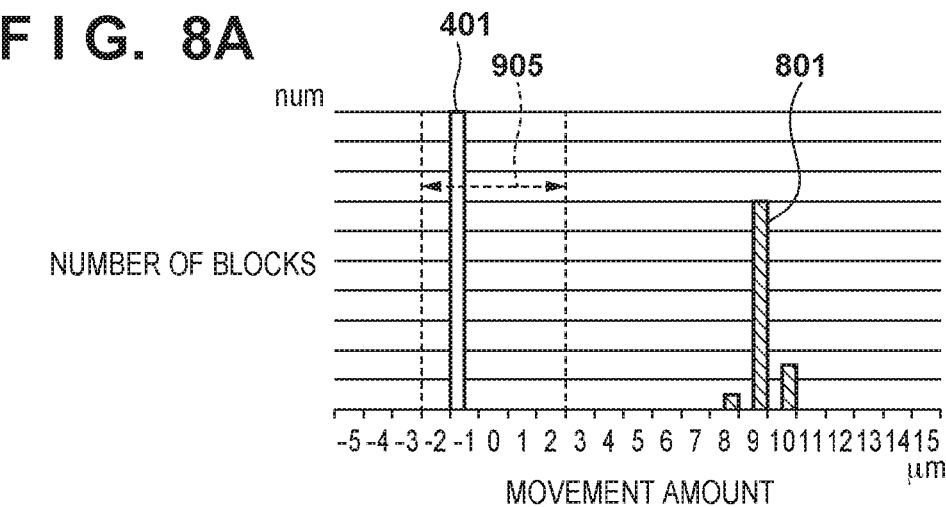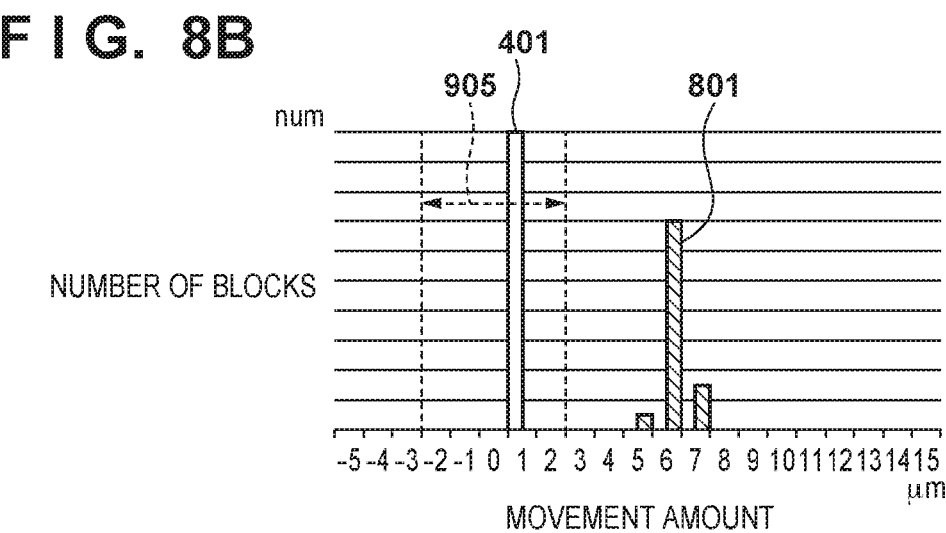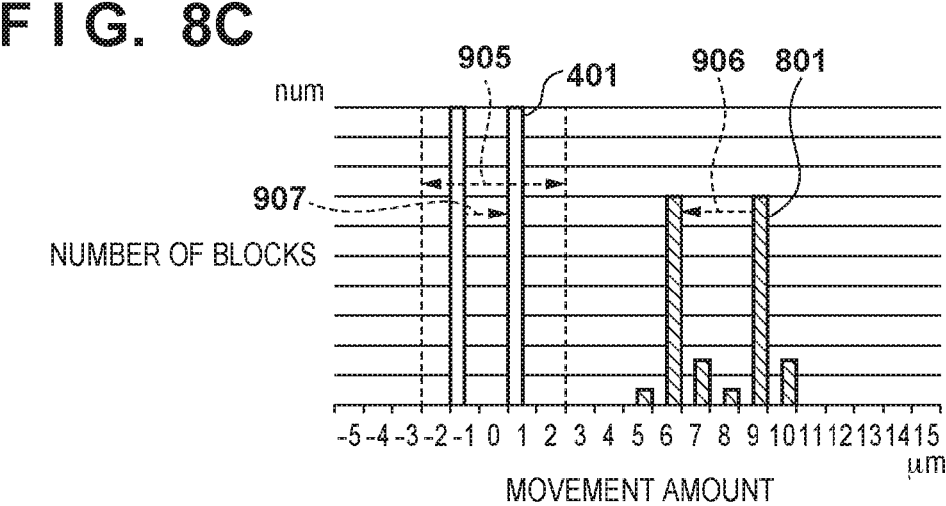

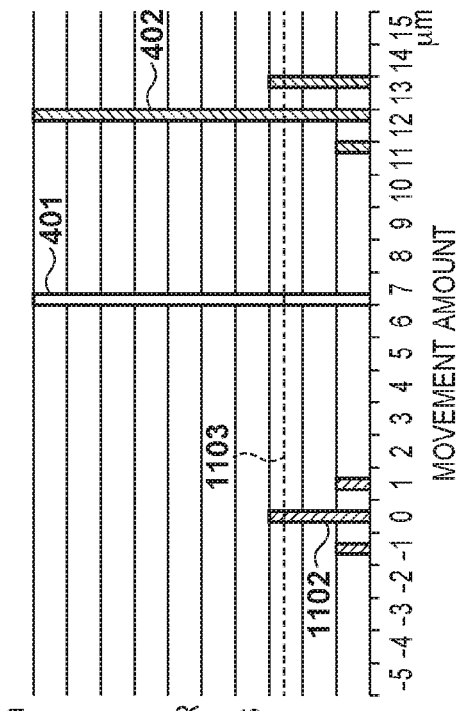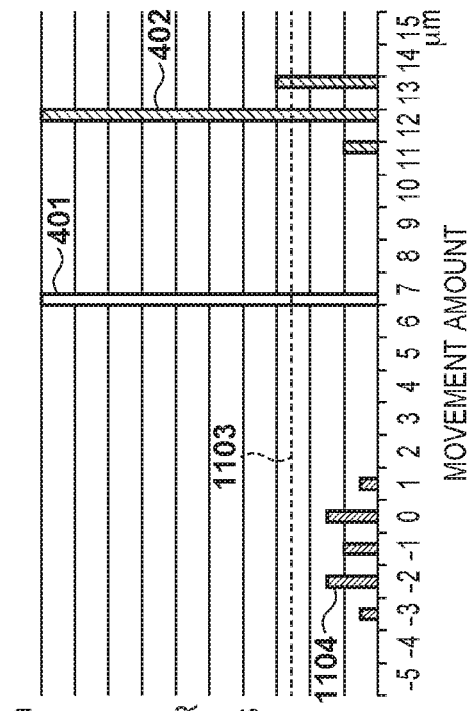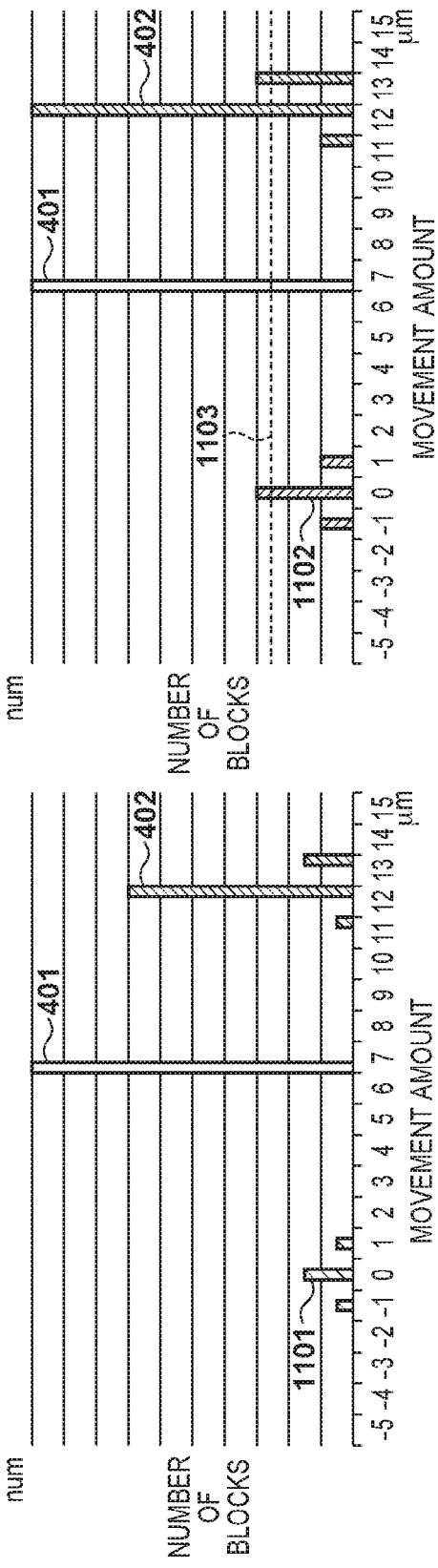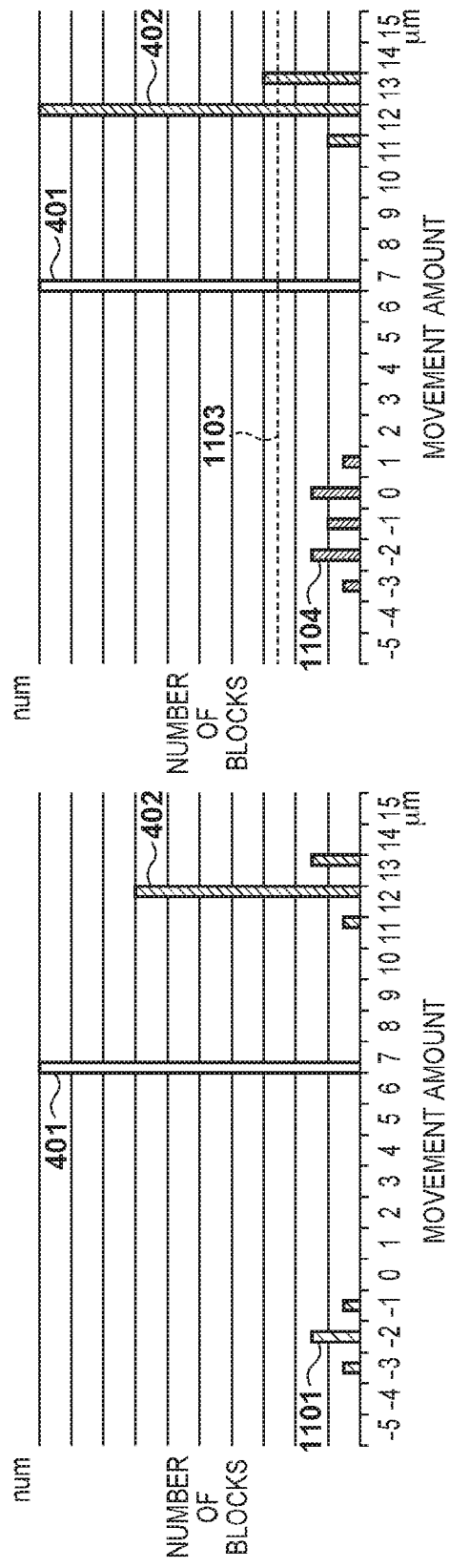

IMAGE CAPTURE APPARATUS WITH PANNING ASSISTANCE FUNCTION AND CONTROL METHOD THEREOF

BACKGROUND OF THE INVENTION

Field of the Invention

The present invention relates to an image capture apparatus and a control method of the image capture apparatus, more particularly to a technique for assisting panning.

Description of the Related Art

Panning is a photography technique that represents a sense of speed of a moving object. The panning is a technique for obtaining images in which an object remains stationary while the background is blurred by performing image-capturing while panning the camera along with the movement of the object. In order to effectively represent the sense of speed by significantly blurring the background, it is often the case that a longer exposure time is set when panning is performed.

In order to successfully perform panning, it is important to pan the camera so as to not move the object on the imaging plane, which requires experience and techniques. Accordingly, a panning assistance function has been proposed that offsets the difference between panning velocity and object velocity by shifting the shift lens (Japanese Patent Laid-Open Nos. 2006-317848 and 2009-267834).

Japanese Patent Laid-Open No. 2006-317848 discloses a technique in which a moving object is detected based on the movement of a camera detected by a gyro sensor and the motion vectors in an image, and a shift lens is driven such that the moving object is positioned at the center of the imaging plane. However, the gyro sensor can detect only the movement in the rotating direction of the camera, and thus if a movement in the translational direction is included in panning, the blurring of the object may not be reduced sufficiently.

Japanese Patent Laid-Open No. 2009-267834 discloses a technique in which a motion vector of an object in the subsequent frame is predicted based on a temporal change (the acceleration rate) of the motion vector detected from the current frame and the previous frame, and a correction optical system is shifted so as to not move the object in the subsequent frame from its position in the current frame. However, because the acceleration rate of the object is determined based on the temporal change in the difference in position between frames, the correction accuracy decreases if the panning operation is not constant.

SUMMARY OF THE INVENTION

The present invention has been made in view of the problems encountered with the conventional techniques described above, and the present invention provides an image capture apparatus that can provide a panning assistance function capable of dealing with various panning operations, and a control method of controlling such an image capture apparatus.

According to an aspect of the present invention, there is provided an image capture apparatus comprising: a computation unit configured to compute an object velocity of an object based on a comparison between a change amount of angular velocities detected by a first detection unit configured to detect an angular velocity and a change amount of motion vectors detected by a second detection unit configured to detect motion vectors for each region of an image; and a control unit configured to change an optical axis based on the object velocity during exposure.

According to another aspect of the present invention, there is provided a control method of controlling an image capture apparatus, the method comprising: computing an object velocity of an object based on a comparison between a change amount of angular velocities detected by a first detection unit configured to detect an angular velocity and a change amount of motion vectors detected by a second detection unit configured to detect motion vectors for each region of an image; and changing an optical axis based on the object velocity during exposure.

Further features of the present invention will become apparent from the following description of exemplary embodiments with reference to the attached drawings.

BRIEF DESCRIPTION OF THE DRAWINGS

FIGS. 6A to 6D are diagrams illustrating the determination of a panning motion component by using a histogram according to the embodiment.

FIGS. 8A to 8F are diagrams illustrating a vector determination process according to the second embodiment.

FIGS. 10A to 10D are diagrams illustrating vector integration according to the second embodiment.

DESCRIPTION OF THE EMBODIMENTS

Exemplary embodiments of the present invention will now be described in detail in accordance with the accompanying drawings. Hereinafter, embodiments will be described in which the present invention is applied to a digital camera used as an example of an image capture apparatus, but the present invention is applicable to any electronic device having an image capture function. Examples of the electronic device include, but are not limited to, a mobile phone, a personal computer, a tablet terminal, and a game console. In addition, in the following embodiments, a configuration that uses an optical manual-vibration correction function will be described, but it is also possible to use a configuration that uses an electronic manual-vibration correction function.

First Embodiment
Functional Configuration of Digital Camera

Figure 1:
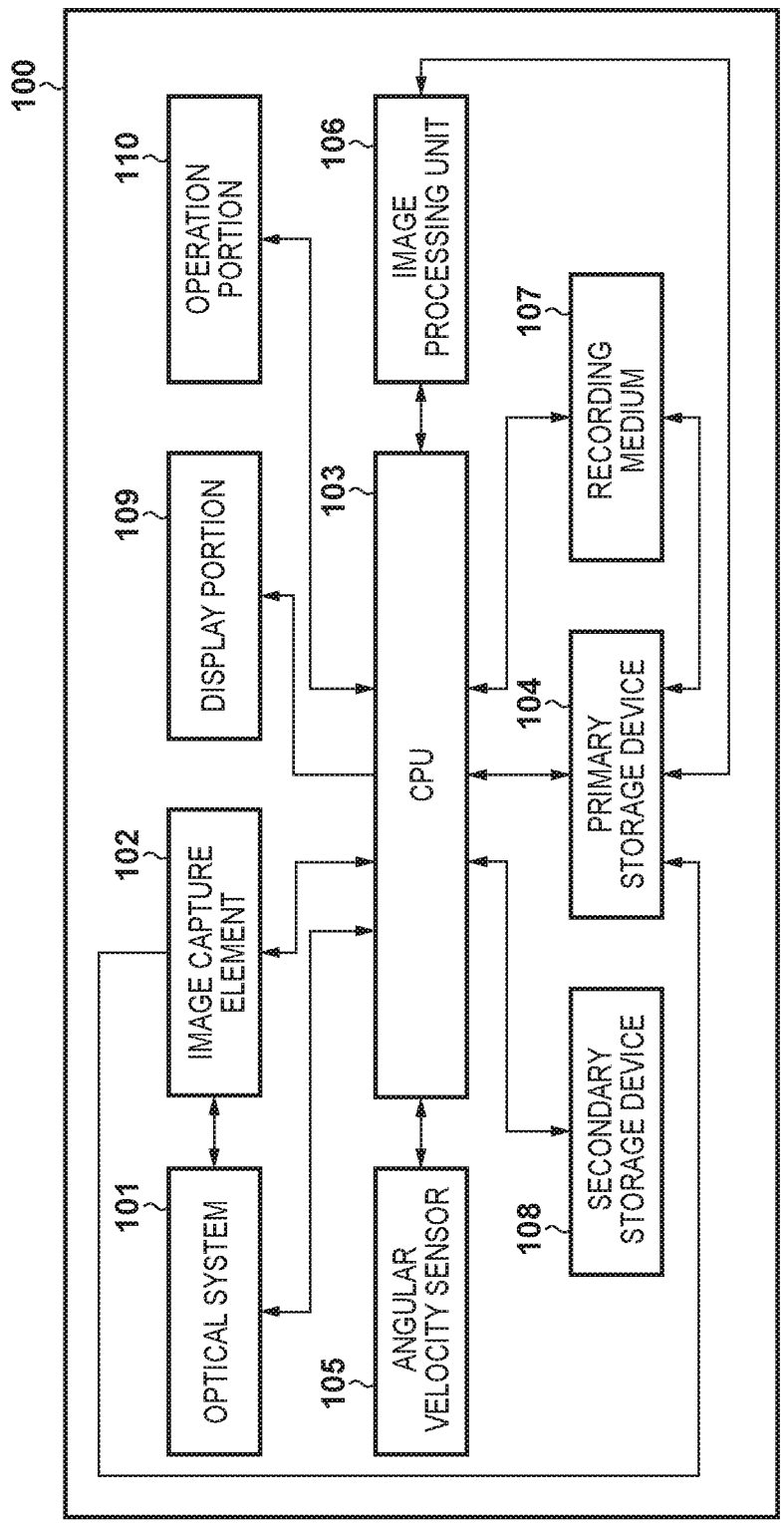
FIG. 1 is a block diagram showing an example of a functional configuration of a digital camera used as an example of an image capture apparatus according to an embodiment of the present invention.

FIG. 1 is a block diagram showing an example of a basic functional configuration of a digital camera 100 according to a first embodiment. An optical system 101 includes a lens, a shutter and a diaphragm, and forms an image, on an image capture element 102, by using the light from an object under control of a CPU 103. The optical system 101 includes a shift lens, which is an optical member for vibration control (changing the optical axis), and a drive circuit for driving the shift lens. The image capture element 102 such as a CCD image sensor or a CMOS image sensor converts the light imaged by the optical system 101 into an image signal.

An angular velocity sensor 105 (first detection unit) such as a gyro sensor detects an angular velocity indicating the movement amount of the digital camera 100, converts the detected angular velocity into an electric signal, and transmits the electric signal to the CPU 103. A primary storage device 104 is a volatile storage device such as, for example, a RAM, and is used as a work area for loading a program or temporarily storing data. The data stored in the primary storage device 104 is used by an image processing unit 106 or recorded in a recording medium 107.

A secondary storage device 108 is a non-volatile storage device such as, for example, an EEPROM, and is used to store various types of setting information and a program (firmware) executed by the CPU 103 to control the digital camera 100. The CPU 103 is an example of a programmable processor, and implements various functions of the digital camera 100 including a panning assistance function, a vibration control function, and functions of capturing, recording and reproducing images, by executing a program to control the units included in the digital camera 100.

The recording medium 107 records the data stored in the primary storage device 104 such as image data obtained by image capturing. The recording medium 107 can be, for example, a semiconductor memory card, and is removable from the digital camera 100, and thus the recorded data can be read by attaching the recording medium 107 to a personal computer or the like. In other words, the digital camera 100 has a mechanism for attaching and detaching the recording medium 107 and a read/write function.

A display portion 109 is used to display viewfinder images during image capturing, captured images, GUI images for interactive operations, and the like. An operation portion 110 is a group of input devices that receive user operations and transmit input information to the CPU 103, and the operation portion 110 includes, for example, a button, a lever, a touch panel, and may also include input devices that use audio and sight lines.

The digital camera 100 according to the present embodiment has a plurality of image processing patterns that are applied to captured images by the image processing unit 106, and a pattern corresponding to an image capture mode that can be set through the operation portion 110 is applied. The image processing unit 106 performs image processing such as so-called development processing, as well as color tone adjustment processing according to the capturing mode, and the like. The image processing unit 106 also performs processing operations such as detection (second detection unit) of a motion vector between images stored in the primary storage device 104, identification of a region in an image as a background region or a main object region, and computation of motion vectors in the background region and the main object region. At least one of the functions of the image processing unit 106 may be implemented with software by the CPU 103 executing a program.

Overall Operations of Panning Assistance Function

Figure 2:
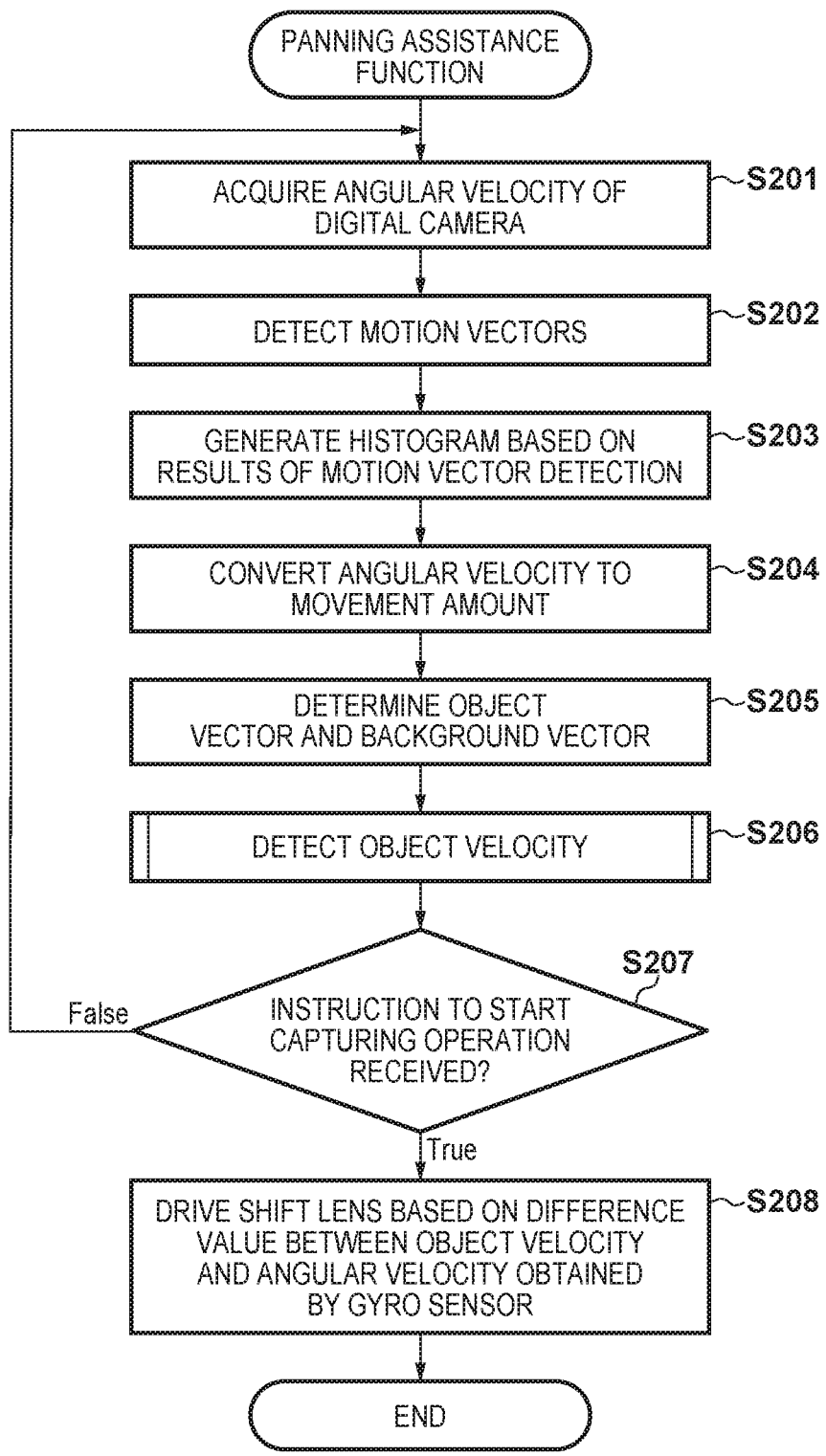
FIG. 2 is a flowchart illustrating overall operations of a panning assistance function according to the embodiment.

FIG. 2 shows overall operations for implementing the panning assistance function implemented by the digital camera 100 according to the present embodiment in the form of a flowchart. The panning assistance function can be started in response to, for example, detection of a shutter button included in the operation portion 110 being pressed halfway down (instruction to start capture preparation processing), but it is also possible to use other start conditions. It is assumed that upon execution of the panning assistance function, moving image capturing (continuous capturing) is executed by the image capture element 102. The moving image capturing may be executed independently of the panning assistance function in order to, for example, acquire images displayed on the electronic viewfinder. Also, the required moving image capturing (continuous capturing) function may be replaced by using an image capture element, such as a photometric sensor (not shown), which is different from the image capture element that actually performs capturing.

First, in S201, the CPU 103 acquires an angular velocity of the digital camera 100 detected by the angular velocity sensor 105.

Next, in S202, the image processing unit 106 detects motion vectors between two frame images captured by the image capture element 102 at different times. The motion vectors are detected in each of a plurality of block regions formed by dividing a frame image. There is no particular limitation on the method for detecting motion vectors between images, and any known method such as a method that uses pattern matching can be used. The motion vector detection may be performed on two consecutive frames of a moving image captured by the image capture element 102, or may be performed on two frames extracted, for example, every predetermined number of frames.

In S203, the image processing unit 106 converts the motion vectors detected in S202 into a movement amount on the imaging plane, and generates a histogram.

In S204, the CPU 103 converts angular velocity ω [rad/sec] of the digital camera 100 acquired in S201 into movement amount l [mm] on the imaging plane. To be specific, the CPU 103 converts the angular velocity ω [rad/sec] into the movement amount l [mm] on the imaging plane by using an expression 1 given below, where the focal distance of the optical system 101 is represented by f [mm], and the frame rate for capturing a moving image is represented by fps [frame/sec].

$$l = f \tan(\omega/\text{fps}) \qquad \text{Expression 1}$$

In the case where the number of frames on which motion vector detection is performed per second is less than the frame rate for capturing a moving image, the value of fps in the expression 1 is changed to the number of frames on which motion vector detection is performed per second.

In S205, the image processing unit 106 (determination unit) determines a vector indicating the movement of the object (hereinafter, referred to as object vector) and a vector indicating the movement of the background (hereinafter, referred to as background vector) using the motion vectors detected in S202. It is assumed here that the object vectors and the background vectors have a magnitude converted to the movement amount on the imaging plane, and unless otherwise stated, the computation of a vector change amount and the comparison between vectors are performed by using the values converted to the movement amount. Also, the object and the background in an image can be determined by a known method such as, for example, a method that uses motion vectors disclosed in Japanese Patent Laid-Open No. 2006-317848.

Figure 3A:
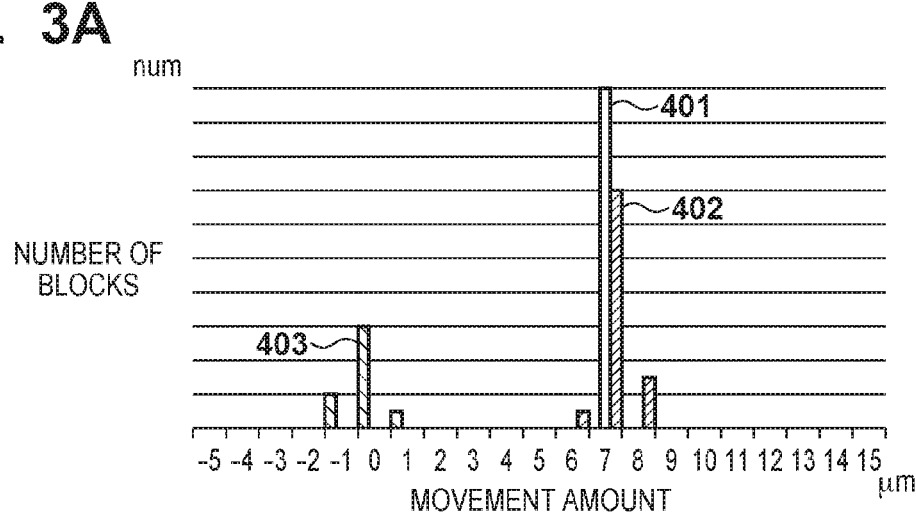
FIGS. 3A to 3C are diagrams illustrating changes in a histogram of movement amount caused by panning.
Figure 3B:
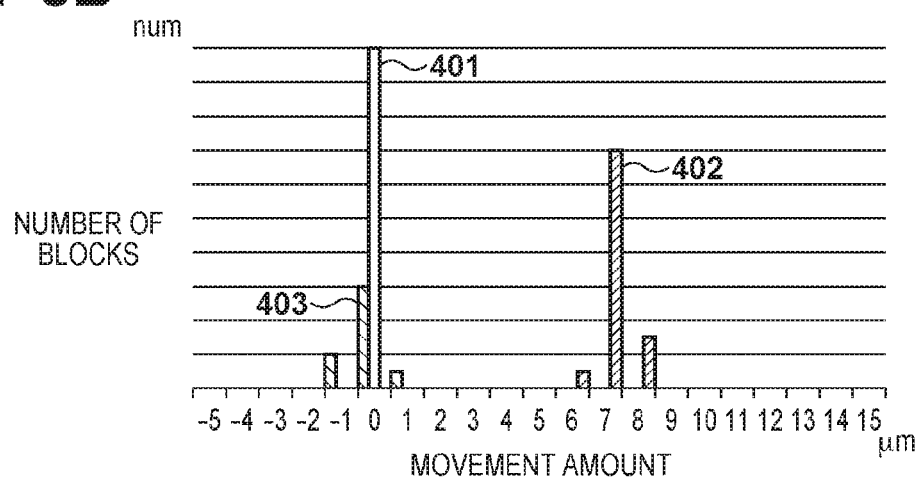
Figure 3C:
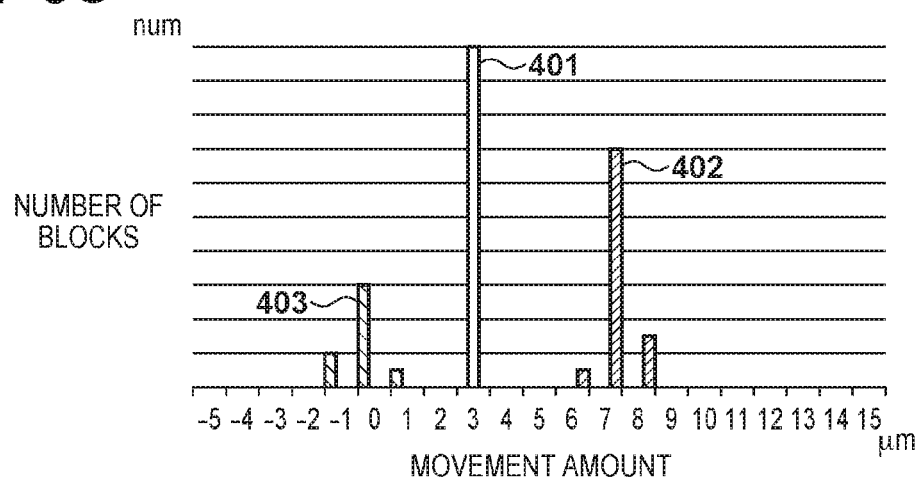

FIGS. 3A to 3C are diagrams each showing the histogram generated by the image processing unit 106 in S203 to which an angular velocity 401, which was converted to the movement amount by the CPU 103 in S204, is added at a maximum frequency. In the following description, unless otherwise stated, it is assumed that, as with the motion vectors, the angular velocity has a value converted to the movement amount on the imaging plane. In the histogram, the horizontal axis indicates the movement amount (μm), and the vertical axis indicates the number of corresponding blocks. The movement amount is scaled in the direction of movement, with the position of a block in the temporally previous frame image being set as the origin.

Changes in the histogram according to the panning operation will now be described with reference to FIGS. 3A to 3C. It is assumed here that a background vector 402 and an object vector 403 were obtained through the determination process in S205. Also, for the sake of facilitating the description and understanding, it is assumed that the object velocity and the panning velocity are appropriate (accordingly, the object vector 403 is approximately 0).

FIG. 3A shows a typical example of a case where the panning operation of the digital camera 100 includes only a rotational component, and in this case, the angular velocity 401 of the digital camera 100 and the background vector 402 are approximately equal between frames.

FIG. 3B shows a typical example of a case where the panning operation of the digital camera 100 includes a component (a shift component or the like) other than the rotational component. In this case, because the panning operation does not include a rotational component, the angular velocity 401 is approximately 0.

FIG. 3C shows a typical example of a case where the panning operation of the digital camera 100 includes both a rotational component and a component other than the rotational component. In this case, because the panning operation includes a rotational component, although the angular velocity 401 is not 0, the angular velocity 401 is smaller than the background vector 402 that reflects the rotational component and the component other than the rotational component.

In S206, the CPU 103 computes the object velocity based on the movement amount 1 determined in S204, and the change amounts of the object vector and the background vector that were obtained through determination process performed by the image processing unit 106 in S205. A detailed description of the method for computing the object velocity will be given later.

In S207, the CPU 103 determines whether to start a capturing operation of the present embodiment (capturing operation for recording). Here, when the shutter button of the operation portion 110 is pressed fully, it is determined that an instruction to start the capturing operation has been issued. If an instruction to start the capturing operation is detected, the CPU 103 advances the process to S208. If an instruction to start the capturing operation is not detected, the CPU 103 returns the process to S201.

In S208, the CPU 103 starts the capturing operation. The CPU 103 implements the panning assistance function by changing the optical axis by driving the shift lens of the optical system 101 based on the difference between the object velocity computed in S206 and the angular velocity of the digital camera 100 obtained by the angular velocity sensor 105 during exposure of the image capture element 102. To be specific, the shift lens may be driven such that the moving velocity of the object reaches 0. Control for driving the shift lens is a known technique, and thus a detailed description thereof is omitted here.

Object Velocity Computation Process

Next, a detailed description of the computation of the object velocity performed in S206 will be given with reference to the flowchart shown in FIGS. 4A and 4B. The following description will be given assuming that information regarding the angular velocity and motion vectors in frames a of the past acquired in steps S201 to S205 is stored in the primary storage device 104.

In S301, the CPU 103 initializes processing frame number n to 0. Here, the processing frame number of the latest frame is set to 0, and each time the processing frame number is incremented by one, it indicates a frame that precedes by one.

In S302, the CPU 103 initializes a shift flag to 0, the shift flag indicating whether a component other than the rotational component has changed when the digital camera 100 is panned. If the shift flag is 0, it indicates that there has been no change in the panning operation or only the rotational component has changed, and if the shift flag is 1, it indicates that an element other than the rotational component such as a shift (translational) component has changed.

In S303, the CPU 103 initializes a speed flag to 0, the speed flag indicating a change in the object velocity. If the speed flag is 0, it indicates that the object is in a uniform motion, if the speed flag is 1, it indicates that the object is in a uniformly accelerated motion, and if the speed flag is 2, it indicates that the object is in an irregular motion other than the uniform motion and the uniformly accelerated motion.

In S304, the CPU 103 initializes a variable to 0, the variable storing an object acceleration rate. The initialization processing for initializing the variable and the flags ends here. In S305 and the subsequent steps, processing for determining how many frames it needs to go back in a plurality of frames stored in the primary storage device 104 in order to obtain reliable information, and processing for computing the object velocity based on the reliable information are performed.

In S305, the CPU 103 determines whether the process after S306 has been executed on the information included in a predetermined number of frames (here, the frames a described above are used) among the information included in a plurality of frames stored in the primary storage device 104. If the value of the processing frame number n is a−1, the CPU 103 advances the process to S319. If the value of the processing frame number n is less than a−1, the CPU 103 advances the process to S306.

In S306, the CPU 103 determines whether the shift flag is 1, or in other words, whether an element other than the rotational component, such as the shift component, has changed. If it is determined that an element other than the rotational component has been added, the CPU 103 advances the process to S319 so as to compute the object velocity based on the information included in the frames before the element other than the rotational component was added. If it is determined that an element other than the rotational component has not been added, the CPU 103 advances the process to S307.

In S307, the CPU 103 determines whether the speed flag is 2, or in other words, whether the object is in an irregular motion. If regularity is not found in the motion of the object, or in other words, the object is in neither a uniform motion nor a uniformly accelerated motion, it is unnecessary to refer to the information included in the frames before the previous frame. Accordingly, if the speed flag is 2, the CPU 103 advances the process to S322 so as to compute the object velocity. If the speed flag is not 2, in order to improve the accuracy of computation of the object velocity by referring to the information included in the previous frame, the CPU 103 advances the process to S308.

In S322, if the processing frame number n is less than 1, the CPU 103 advances the process to S323, and sets the object velocity to 0. By doing so, a normal manual-vibration correction is performed during exposure of the capturing operation rather than the panning assistance function. If, on the other hand, n is 1 or more, the CPU 103 advances the process to S319.

If it is determined in S307 that the object is in a uniform motion or a uniformly accelerated motion, then in S308, the CPU 103 determines whether the speed flag is 1, or in other words, whether it has already been determined that the object is in a uniformly accelerated motion. If the speed flag is 1, the CPU 103 advances the process to S313. If the speed flag is 0 (there is a possibility that the object is in a uniform motion), the CPU 103 advances the process to S309.

In S309, the CPU 103 makes a comparison so as to determine whether the difference between the change amount of the object vectors and the change amount of the background vectors between the previous frame and the current frame is less than or equal to a threshold value by using an expression 2.

$$|(\text{Object vector}_{n+1} - \text{Object vector}_n) - (\text{Background vector}_{n+1} - \text{Background vector}_n)| \leq \text{Threshold value}_v \quad \text{Expression 2}$$

The threshold value$_v$ is a threshold value that defines a range in which the change amount of the object vectors and the change amount of the background vectors are deemed to be equal (or in other words, a range in which it is determined that the object is in a uniform motion), and can be set in advance. If it is determined that the expression 2 is satisfied, the CPU 103 advances the process to S310. If it is determined that the expression 2 is not satisfied, the CPU 103 advances the process to S313.

Figure 5A:
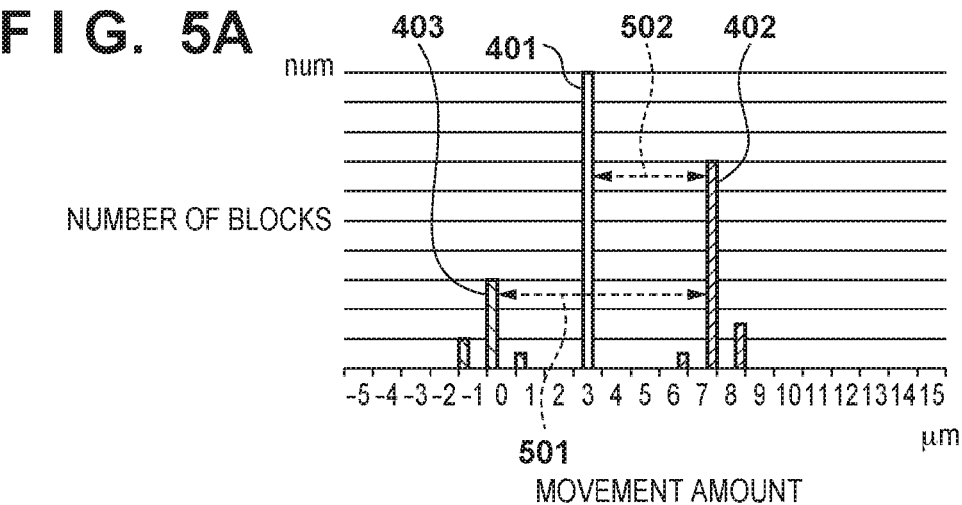
FIGS. 5A to 5E are diagrams illustrating the determination of a uniform motion of an object by using a histogram according to the embodiment.

A description will be given of the determination of the objet being in a uniform motion by using the histogram with reference to FIGS. 5A to 5E. It is assumed that FIG. 5A shows the current frame (processing frame number n), and FIG. 5B (or FIG. 5D) shows the previous frame (processing frame number n+1). If the object is in a uniform motion, a difference 501 between the object vector 403 and the background vector 402 and a difference 503 between the object vector 403 and the background vector 402 are almost unchanged. Accordingly, irrespective of the directional components included in the panning operation of the digital camera 100, a change amount 505 of the object vector and a change amount (movement amount) 506 of the background vector are approximately equal between the current frame and the previous frame (see FIGS. 5C and 5E).

In S310, the CPU 103 makes a comparison so as to determine whether the difference between the change amount of the angular velocities and the change amount of the background vectors generated between the previous frame and the current frame is less than or equal to a threshold value by using an expression 3. As used herein, the angular velocity is a value that has been converted to the movement amount on the imaging plane in S204.

$$|(\text{Angular velocity}_{n+1} - \text{Angular velocity}_n) - (\text{Background vector}_{n+1} - \text{Background vector}_n)| \leq \text{Threshold value}_g \quad \text{Expression 3}$$

The threshold value$_g$ is a threshold value that defines a range in which the change amount of the angular velocities and the change amount of the background vectors are deemed to be equal, and can be set in advance. If the expression 3 is satisfied, it is determined that the panning state of the digital camera 100 is unchanged between frames, or only the rotational component has changed, and the CPU 103 advances the process to S311. If the expression 3 is not satisfied, the CPU 103 advances the process to S312.

A description will be given of the determination of the panning operation of the digital camera 100 by using the histogram with reference to FIGS. 5A to 5E. Note that for the sake of facilitating the description and understanding, the angular velocity 401 is unchanged in FIGS. 5A, 5D and 5E, but may actually be changed.

Figure 5B:
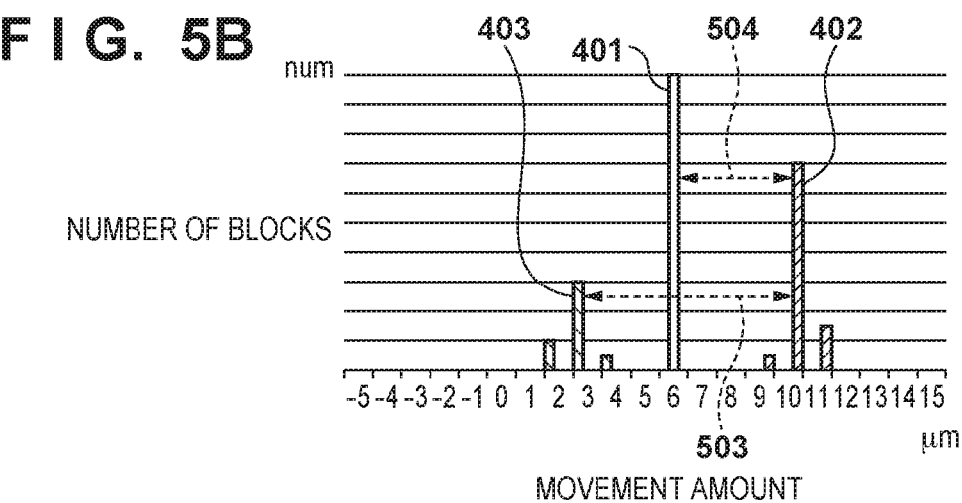
Figure 5C:
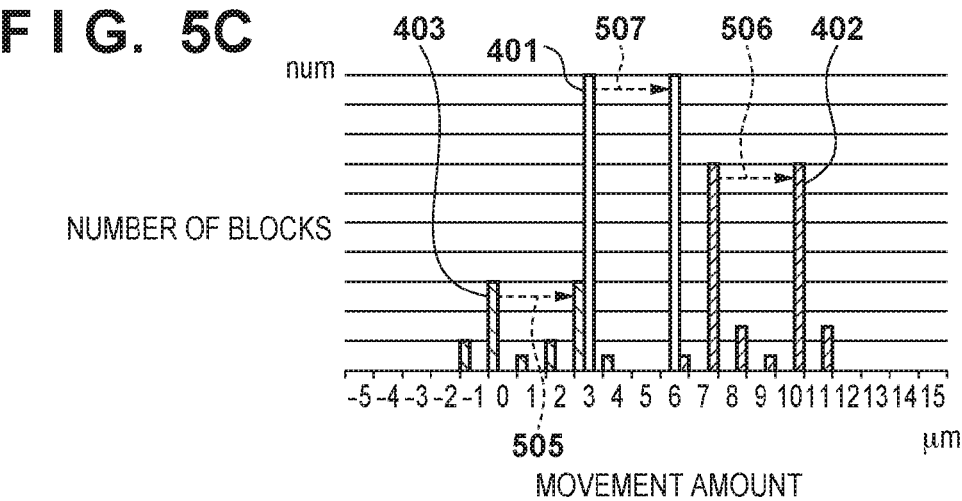

It is assumed that FIG. 5A shows the current frame (processing frame number n), and FIG. 5B shows the previous frame (processing frame number n+1). If there has been no change in the panning state except for the rotational component, a difference 502 between the angular velocity 401 and the background vector 402 and a difference 504 between the angular velocity 401 and the background vector 402 are almost unchanged. Accordingly, a change amount (movement amount) 507 of the angular velocity and the change amount (movement amount) 506 of the background vector are approximately equal between the current frame and the previous frame (FIG. 5C).

Accordingly, if it is determined in S310 that the expression 3 is satisfied, it is possible to determine that the object is in a uniform motion and the panning state of the digital camera 100 is stable (only the rotational component has changed). Thus, the CPU 103 updates the processing frame number n to n+1, which is the next frame number.

Figure 5D:
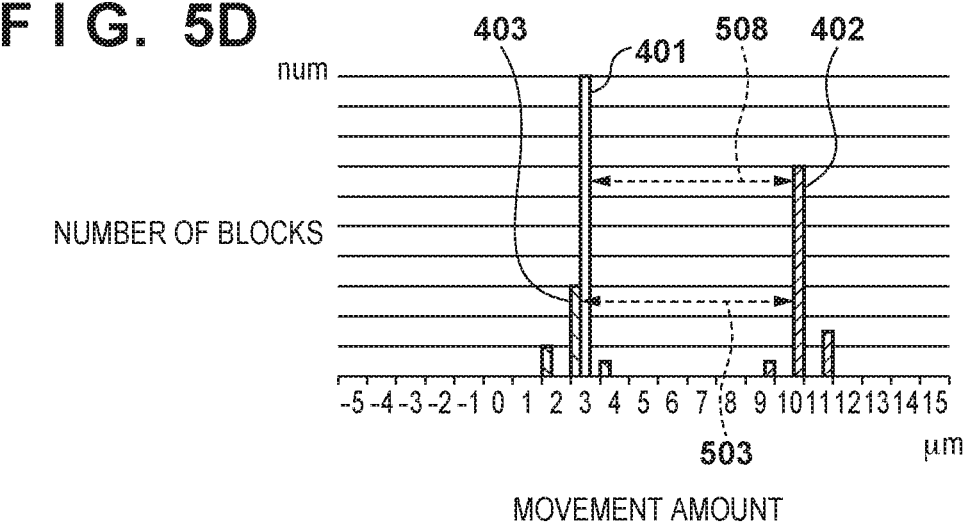
Figure 5E:
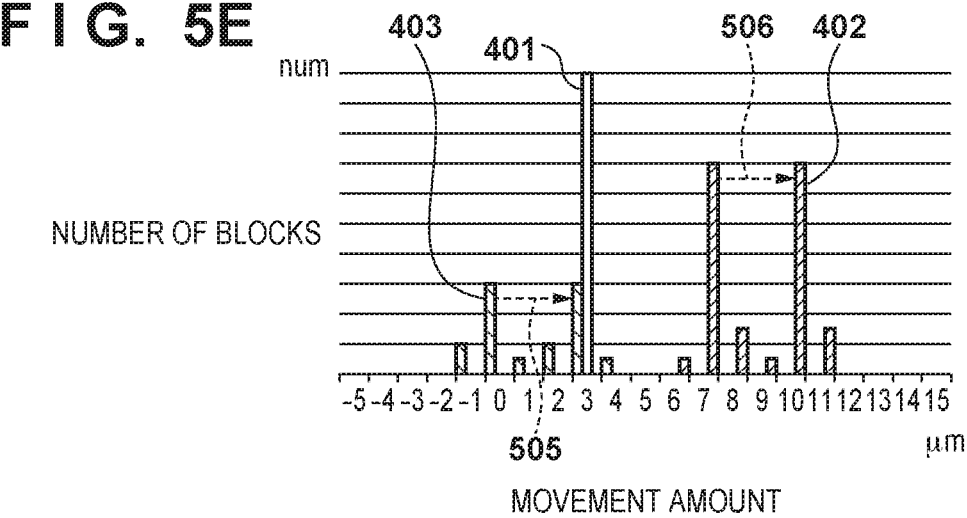

On the other hand, it is assumed that FIG. 5A shows the current frame (processing frame number n), and FIG. 5D shows the previous frame (processing frame number n+1). If there has been a change in the panning state, or in other words, a component other than the rotational component has changed, the difference 502 between the angular velocity 401 and the background vector 402 and a difference 508 between the angular velocity 401 and the background vector 402 are significantly large (> threshold value$_g$).

Figure 4A:
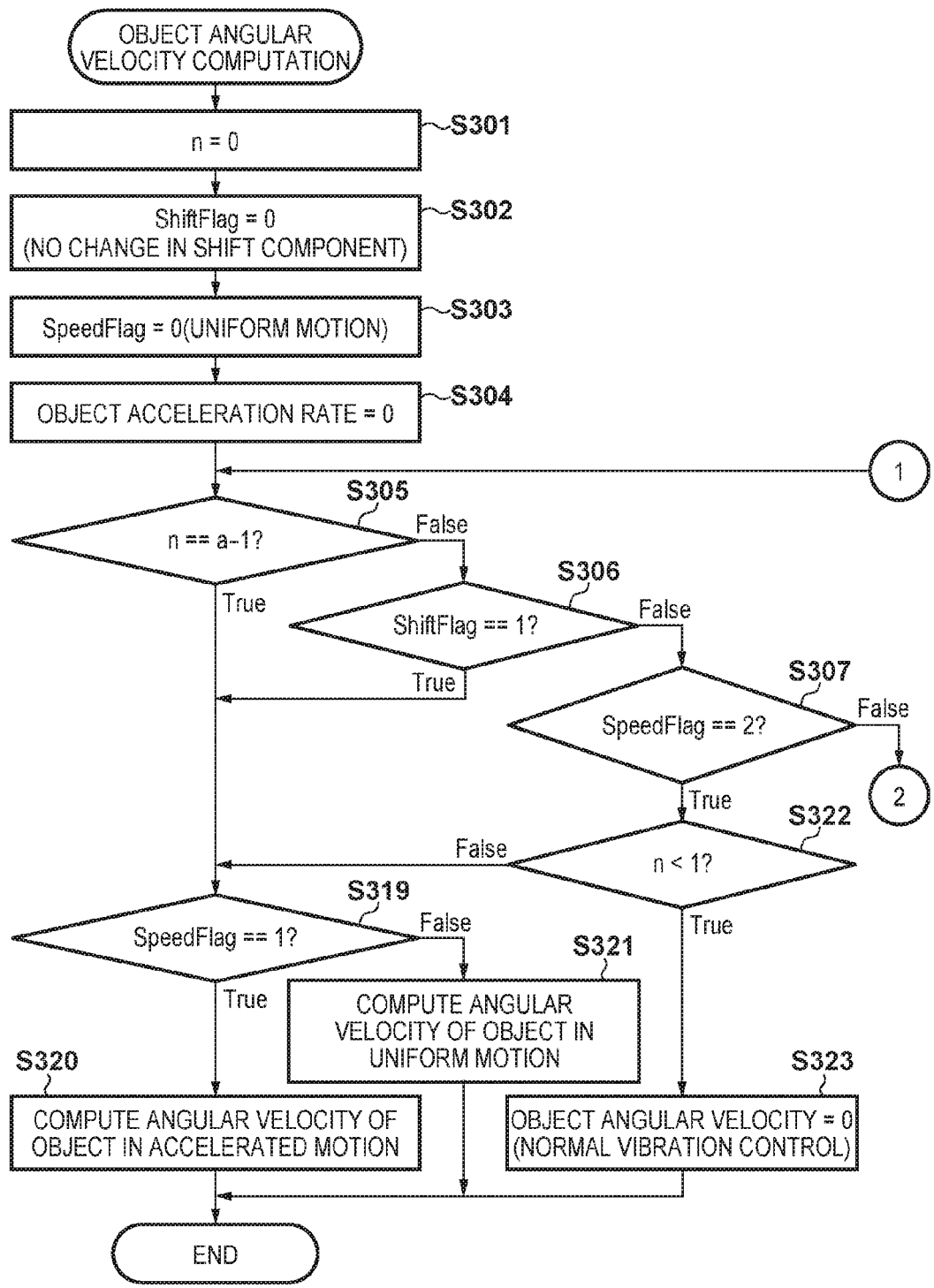
FIGS. 4A and 4B show a flowchart illustrating computation process for computing an object velocity according to a first embodiment.
Figure 4B:
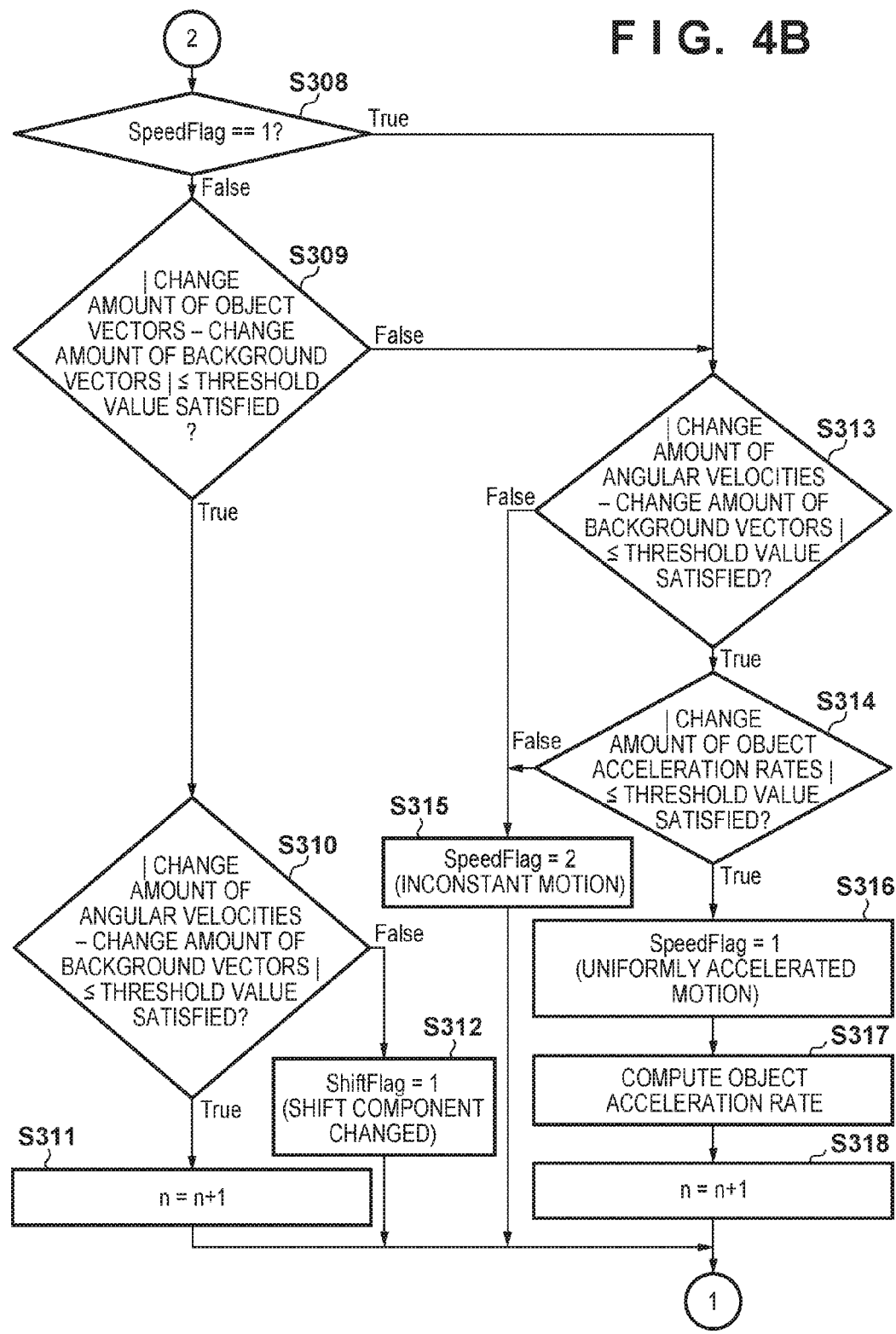

Accordingly, if it is determined in S310 of FIG. 4B that the expression 3 is not satisfied, it is possible to determine that the object is in a uniform motion, but the panning state of the digital camera 100 is not stable (an element other than the rotational component, such as the shift component, has changed). For this reason, in S312, the CPU 103 sets the shift flag to 1, and advances the process to object velocity computation.

The process of S313 is performed when it is determined that the object is not in a uniform motion, or in other words, when it is determined that the object is in a uniformly accelerated motion or a motion in which the change in velocity is not constant.

In S313, as in S310, the CPU 103 makes a comparison so as to determine whether the difference between the change amount of the angular velocities and the change amount of the background vectors generated between the previous frame and the current frame is less than or equal to a threshold value by using the expression 3. If it is determined that the expression 3 is satisfied, the CPU 103 advances the process to S314. If a component other than the rotational component has changed, as in the relationship between the frames shown in FIGS. 5A and 6C, it is determined that the expression 3 is not satisfied. This can be determined from the fact that in FIG. 6D, a change amount 607 of the background vectors 402 is larger than the change amount of the angular velocities 401. In this case, the CPU 103 advances the process to S315.

In S314, the CPU 103 determines whether the change amount of the object acceleration rates is less than or equal to a threshold value by using an expression 4. In the case where the processing frame number n is 0, because it is not possible to compute the change amount of the object acceleration rates, it is invariably determined that the expression 4 is satisfied.

If $n \geq 1$,

|Object acceleration rate$_n$−(Background vector$_{n+1}$−
Object vector$_{n+1}$)−(Background vector$_n$−
Object vector$_n$)|≤Threshold value$_a$   Expression 4

As the object acceleration rate$_n$, the value computed in S317 is used.

The threshold value$_a$ is a threshold value for determining whether there is a possibility that the object is in a uniformly accelerated motion, and can be set in advance. If it is determined that the expression 4 is satisfied, the CPU 103 advances the process to S316. If it is determined that the expression 4 is not satisfied, the CPU 103 advances the process to S315.

A description will be given of the determination of the object being in a uniformly accelerated motion by using the histogram with reference to FIGS. 5A to 5E and FIGS. 6A to 6D. It is assumed that FIG. 5A shows the current frame (processing frame number n), and FIG. 6A shows the previous frame (processing frame number n+1). If there has been a change in the object velocity, the difference 501 between the object vector 403 and the background vector 402 and a difference 601 between the object vector 403 and the background vector 402 are different. The change in velocity is indicated by a difference value 605 of the background vector 402 in FIG. 6B.

For the sake of facilitating the description and understanding, FIG. 6B shows a case where appropriate panning is performed with respect to the motion of the object. Accordingly, the object vector 403 is approximately 0, and a change amount 603 of the background vector and the difference value 605 (=|Difference 601−Difference 501|) appear to be equal.

If the difference between the object vector 403 and the background vector 402 (Difference 501−Difference 601) is approximately the same between the previous frame and the frame before the previous frame (processing frame number n+2), it is possible to determine that the object is in a uniformly accelerated motion.

If it is determined in S314 that there is a possibility that the object is in a uniformly accelerated motion, then in S316, the CPU 103 sets the value of the speed flag to 1, which is a value that indicates the result of determination.

In S317, the CPU 103 computes the object acceleration rate according to an expression 5 given below.

Object acceleration rate$_n$=Object acceleration
rate$_{n-1}$+Difference value 605/(1/fps)   Expression 5

In S318, the CPU 103 updates the processing frame number n by incrementing it by one, and returns the process to S305.

In the case where it is determined in S313 that an element other than the rotational component has changed by panning and in the case where it is determined in S314 that the object is not in a uniformly accelerated motion, it is not possible to expect an improvement in the accuracy of the object velocity by referring to the information included in the frames of the past before the current frame. Accordingly, in S315, the CPU 103 sets the value of the speed flag to 2, which is a value that indicates that the object is in an irregular motion, and returns the process to S305. By doing so, the object velocity can be computed based on the information as of the current frame.

Hereinafter, the process for computing the object velocity performed in S319 and the subsequent steps will be described.

In S319, the CPU 103 determines whether the speed flag is 1. This corresponds to the process of determining whether the object is in a uniformly accelerated motion, or the object is in a uniform motion (or in an inconstant motion). If the speed flag is 1 (if it is determined that the object is in a uniformly accelerated motion), the CPU 103 advances the process to S320. If the speed flag is 0 (if it is determined that the object is in a uniform motion), the CPU 103 advances the process to S321. The CPU 103 advances the process to S321 as well if the speed flag is 2, and the processing frame number n is greater than or equal to 1.

Here, if the movement amount on the image plane is represented by l [mm], and the focal distance of the optical system 101 is represented by f [mm], and the frame rate for capturing a moving image is represented by fps [frame/sec], the movement amount l [mm] can be converted to an angular velocity $\omega_x$ [rad/sec] by using an expression 6 given below.

$$\omega_x = \text{fps} \times \tan^{-1}(1/f)$$   Expression 6

In S320, the CPU 103 computes an object angular velocity $\omega_2$ [rad/sec] by using an expression 7 given below, where the angular velocity at the time of capturing the latest frame is represented by $\omega_0$ [rad/sec], the angular velocity obtained by converting the movement amount of the object vector detected in the latest frame by using the expression 6 given above is represented by $\omega_1$ [rad/sec], the angular acceleration rate of the object is represented by a [rad/sec], the difference value 605 is represented by d [mm], and the time required to start exposure is represented by t [sec]. It is also possible to perform correction while updating the angular velocity of the object during the exposure time by using the angular acceleration rate a [rad/sec] of the object.

$$a = \text{fps} \times \tan^{-1}(d/f)$$

$$\omega_2 = (\omega_0 + \omega_1) + (a \times t)$$   Expression 7

On the other hand, in S321, the CPU 103 computes an object angular velocity $\omega_3$ [rad/sec] by using an expression 8 given below, where the angular velocity at the time of acquiring each frame is represented by $\omega_0$ [rad/sec], and the angular velocity obtained by converting the movement amount of the object vector in the frame by using the expression 6 is represented by $\omega_1$ [rad/sec].

$$\omega_3 = \frac{\sum_n (\omega_0 + \omega_1)}{n}$$   Expression 8

As used herein, "each frame" refers to one of the frames starting from a processing frame number of 0 to a frame immediately before speed flag=2 or shift flag=1 is determined, and includes the frames a at most.

As described above, according to the present embodiment, a tendency in the change in velocity of the moving object and a directional component of the panning operation are determined based on the angular velocity of the image capture apparatus and the motion vectors detected between images. Then, by performing vibration control during exposure based on the object velocity computed by the method corresponding to the result of determination, the panning assistance function of appropriately assisting the panning operation is implemented. Also, the panning assistance is not performed where inappropriate, and it is therefore possible to suppress a reduction in the quality of images caused by the panning assistance function.

Second Embodiment

Next, a second embodiment of the present invention will be described. The present embodiment may be the same as the first embodiment except that the vector determination process (FIG. 2, S205) and the object velocity detection process (S206) are different from those of the first embodiment. Accordingly, in the following, differences from the first embodiment will be mainly described.

Vector Determination Process

Figure 7:
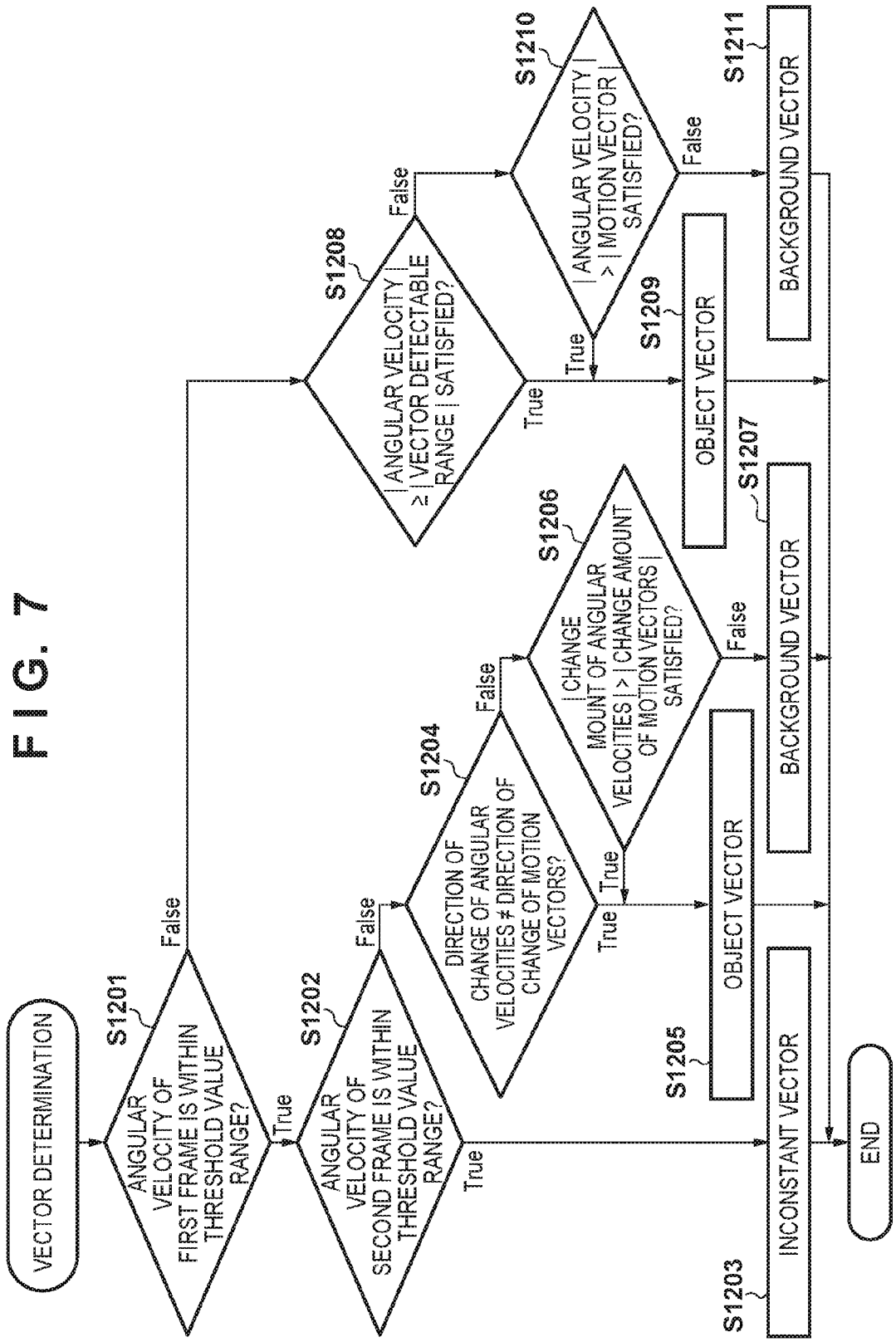
FIG. 7 is a flowchart illustrating vector determination process according to a second embodiment.

FIG. 7 is a flowchart illustrating vector determination process according to the present embodiment in detail, and more specifically, process performed when only either the object vector or the background vector is detected. In the following description, as in the first embodiment, it is assumed that the angular velocity of the digital camera 100 and the motion vectors detected by the image processing unit 106 have been converted to the movement amount on the imaging plane. Accordingly, the value of "angular velocity" and the value of "vector" in the following description are values that have been converted to the movement amount on the imaging plane.

In S1201, the CPU 103 determines whether the angular velocity 401 of the first frame (the first image) (FIG. 8A) is within a threshold value range 905. In the threshold value range 905, 0 is set as the center, and if the angular velocity 401 is outside the threshold value range 905, it is determined that an angular velocity large enough to detect a change in angular velocity between frames has been detected even if an offset of the angular velocity sensor 105 is taken into consideration. If the angular velocity 401 of the first frame is outside the threshold value range 905, the CPU 103 advances the process to S1208. Otherwise, the CPU 103 advances the process to S1202.

In S1202, the CPU 103 determines, in the same manner as in S1201, whether the angular velocity 401 of the second frame (the second image) (FIG. 8B) is within the threshold value range 905. If, in the second frame as well, the angular velocity 401 is within the threshold value range 905, and a sufficient angular velocity has not been detected, it is difficult to detect a change 907 in the angular velocity (FIG. 8C) and a change 906 in the motion vector (FIG. 8C) between the frames. Accordingly, the CPU 103 advances the process to S1203, and determines a detected motion vector 801 as an inconstant vector (FIG. 8C). The threshold value range 905 used in S1201 and S1202 may not be the same range, and the threshold value range may be set to be wider in S1201 so as to make it more difficult to determine the detected motion vector as an inconstant vector than when the same threshold value range is used.

On the other hand, if it is determined in S1202 that a sufficient angular velocity has been detected in the second frame (if it is determined that a change in the angular velocity and the motion vector between frames can be detected), the CPU 103 advances the process to S1204. In S1204, the CPU 103 compares the direction of change of the angular velocity and the direction of change of the motion vector (increasing direction or decreasing direction) between frames.

If the direction of change of the angular velocity and the direction of change of the motion vector are different, it is possible to determine that the motion vector also includes a motion unrelated to the panning operation of the digital camera 100. Accordingly, the CPU 103 advances the process to S1205, and determines the detected motion vector as an object vector.

If, on the other hand, it is determined that the direction of change of the angular velocity and the direction of change of the motion vector are the same, the CPU 103 advances the process to S1206, and determines whether the change amount of the motion vectors is smaller than the change amount of the angular velocities. If the change amount of the motion vectors is smaller than the change amount of the angular velocities, it is possible to determine that the motion vector also includes a motion different from the panning operation of the digital camera 100. Accordingly, the CPU 103 advances the process to S1205, and determines the detected motion vector as an object vector.

Furthermore, if the change amount of the motion vectors is greater than or equal to the change amount of the angular velocities, it is possible to determine that the background is blurred by the panning operation of the digital camera 100. Accordingly, the CPU 103 advances the process to S1207, and determines the detected motion vector as a background vector.

Next, process performed in S1208 and the subsequent steps will be described. S1208 is executed when, for example, as shown in FIG. 8E, a sufficient angular velocity 401 has been detected (the angular velocity 401 is outside a threshold value range 702) in the first frame.

Figure 8D:
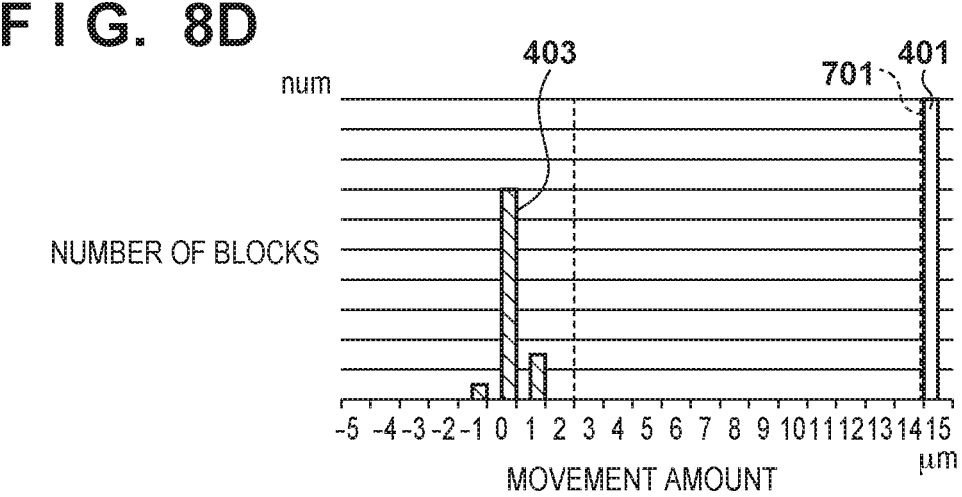
Figure 8E:
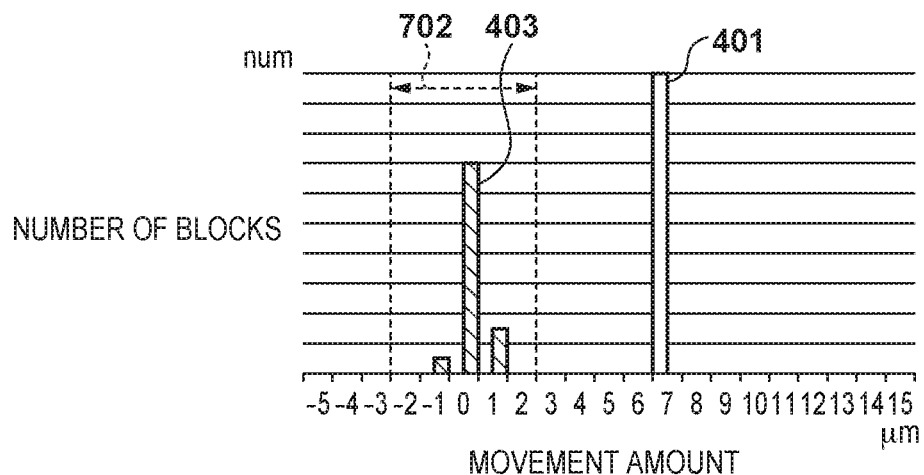

In S1208, the CPU 103 determines whether or not the detected angular velocity 401 is greater than or equal to the upper limit of a motion vector detectable range 701 (FIG. 8D). If, as shown in FIG. 8D, the angular velocity 401 has a magnitude that is greater than or equal to the upper limit of the motion vector detectable range 701, it is possible to determine that the background vector is outside the motion vector detectable range 701. Accordingly, the CPU 103 advances the process to S1209, and determines the detected motion vector 403 as an object vector.

Figure 8F:
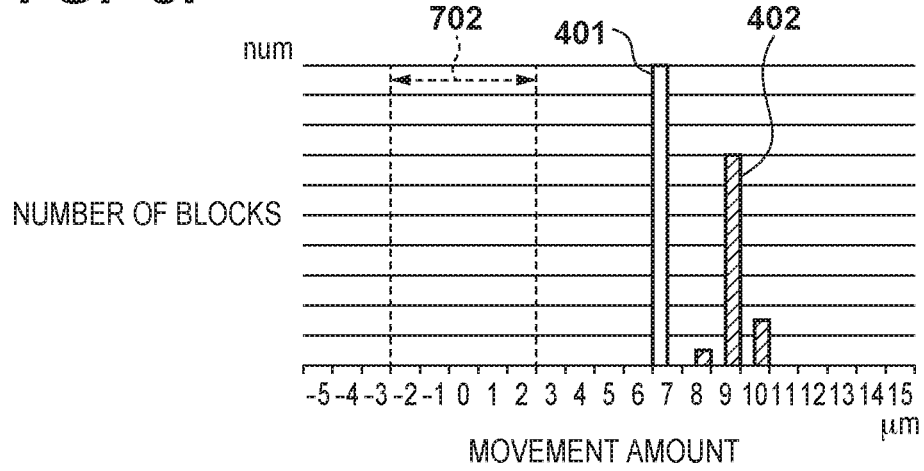

If, on the other hand, it is determined in S1208 that the angular velocity 401 is not greater than or equal to the upper limit of the motion vector detectable range 701, the CPU 103 advances the process to S1210, and determines whether or not the angular velocity is greater than the motion vector. As described above, when the panning operation includes only the rotational component, the angular velocity and the background vector have the same magnitude. However, if the panning operation includes an element other than the rotational component such as the shift component, the sum of the movement amount generated by the angular velocity and the movement amount generated by the influence of the element other than the rotational component is the movement amount of the background vector. Accordingly, if, as shown in FIG. 8E, it is determined that the angular velocity 401 is greater than the motion vector 403, the CPU 103 advances the process to S1209, and determines the detected motion vector 403 as an object vector. If, on the other hand, as shown in FIG. 8F, it is determined that the magnitude of the motion vector 402 is greater than or equal to the angular velocity 401, the CPU 103 advances the process to S1211, and determines the detected motion vector 402 as a background vector.

Object Velocity Computation Process

Figure 9A:
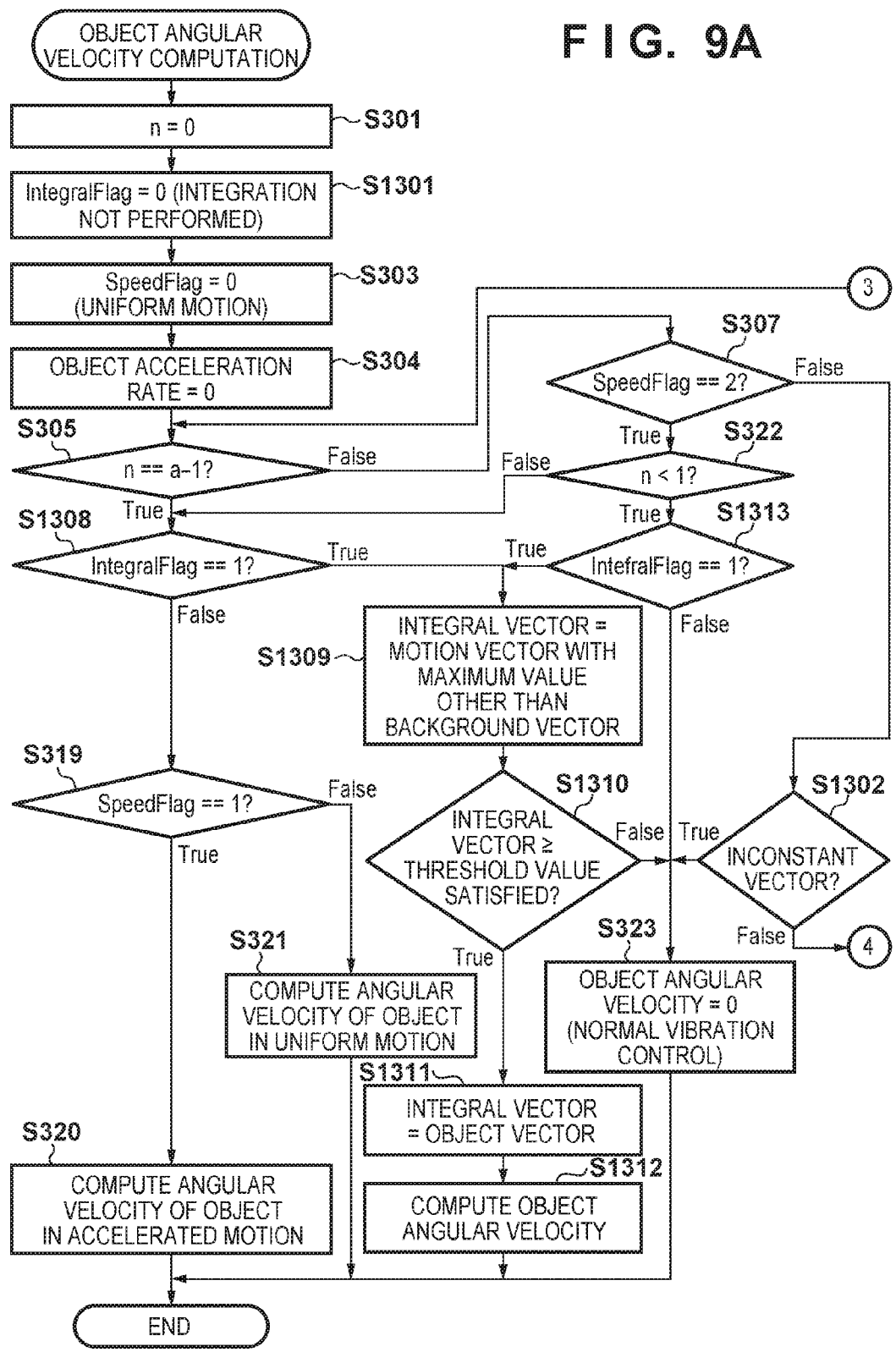
FIGS. 9A and 9B show a flowchart illustrating computation process for computing an object velocity according to the second embodiment.
Figure 9B:
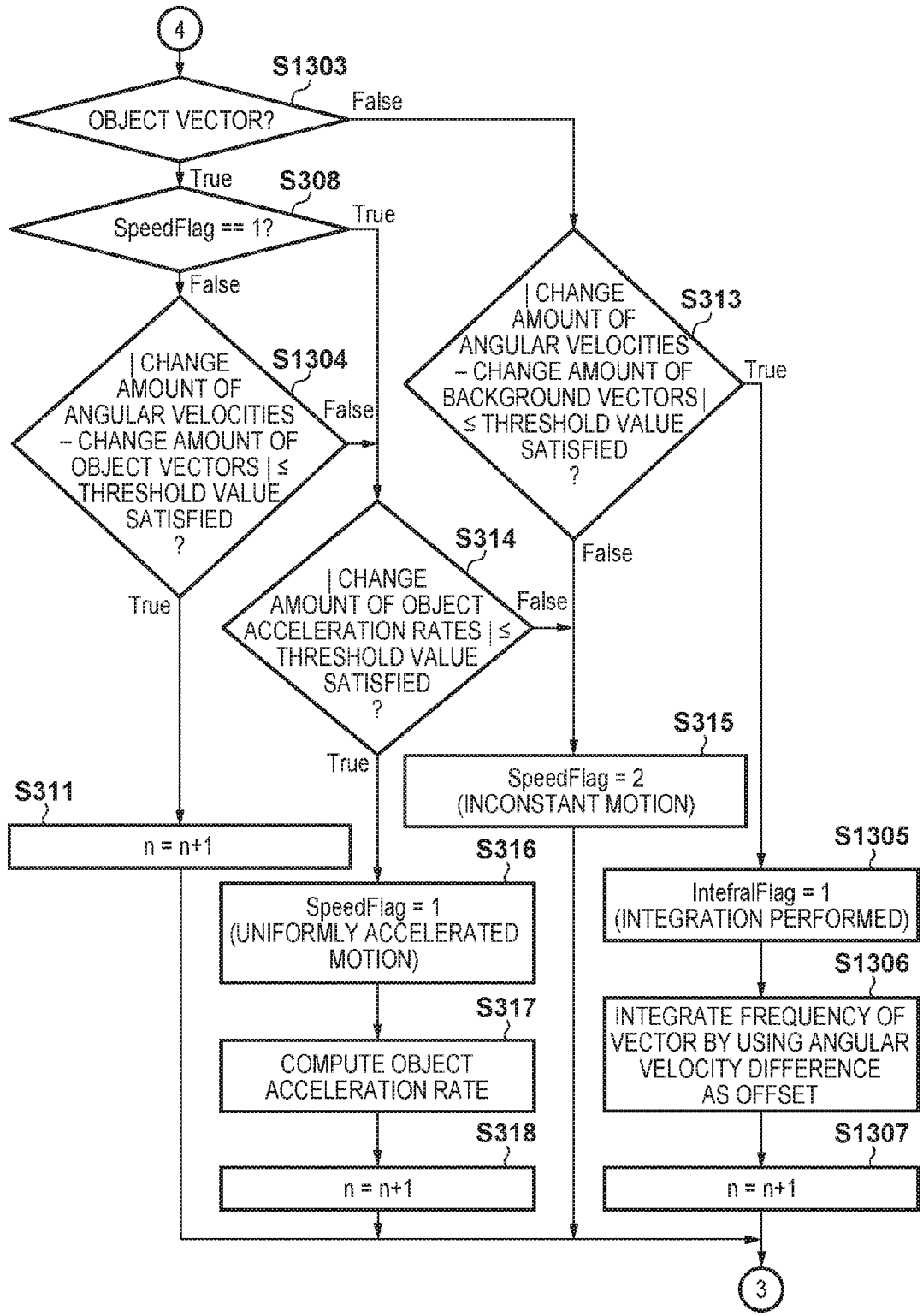

Next, object velocity computation process according to the present embodiment will be described in detail with reference to the flowchart shown in FIGS. 9A and 9B. The process steps that are the same as those of the object velocity computation process according to the first embodiment are given the same reference numerals as those used in FIGS. 4A and 4B, and redundant descriptions are omitted.

Step S301 is the same process as that of FIG. 4A, and thus a description thereof is omitted.

In S1301, the CPU 103 initializes an integral flag to 0. The integral flag takes a value of 0 or 1, and the integral flag indicates, if the value is 0, integration has not been performed, and if the value is 1, integration has been performed.

Steps S303 to S305 are the same processes as those of FIG. 4A, and thus descriptions thereof are omitted.

If it is determined in S307 that the speed flag is not 2, the CPU 103 advances the process to S1302.

In S1302, the CPU 103 determines whether the motion vector has been determined as an inconstant vector in the vector determination process described above. If it is determined that the motion vector has been determined as an inconstant vector, the CPU 103 advances the process to S323. If it is determined that the motion vector has not been determined as an inconstant vector, the CPU 103 advances the process to S1303. In S323, the CPU 103 sets the object velocity to 0. By doing so, a normal manual-vibration correction is performed during exposure of the capturing operation.

In S1303, the CPU 103 determines whether the motion vector has been determined as an object vector in the vector determination process described above. If it is determined that the motion vector has been determined as an object vector, the CPU 103 advances the process to S308. If it is determined that the motion vector has not been determined as an object vector, the CPU 103 advances the process to S313.

If it is determined in S308 that the speed flag is 1, the CPU 103 advances the process to S314. If it is determined that the speed flag is not 1, the CPU 103 advances the process to S1304.

In S1304, the CPU 103 determines whether the difference between the change amount of the angular velocities and the change amount of the object vectors generated between the current frame and the previous frame is less than or equal to a threshold value, by using an expression 9.

$$|(\text{Angular velocity}_{n+1} - \text{Angular velocity}_n) - (\text{Object vector}_{n+1} - \text{Object vector}_n)| \leq \text{Threshold value}_w \quad \text{Expression 9}$$

The threshold value$_w$ is a threshold value that defines a range in which the change amount of the angular velocities and the change amount of the object vectors are deemed to be equal (or in other words, a range in which it is determined that the object is in a uniform motion, and the panning state is stable or only the angular velocity component has changed), and can be set in advance. If it is determined that the expression 9 is satisfied, the CPU 103 advances the process to S311, where the CPU 103 updates the processing frame number n by incrementing it by one, and returns the process to S305. If it is determined that the expression 9 is not satisfied, the CPU 103 advances the process to S314. In the case where the expression 9 is not satisfied, the determination of a uniformly accelerated motion in S314 may be skipped and the process may be advanced directly to S315.

In S314, the CPU 103 determines whether the change amount of the object acceleration rates is less than or equal to a threshold value by using an expression 10. In the case where the processing frame number n is 0, because it is not possible to compute the change amount of the object acceleration rates, it is invariably determined that the change amount of the object acceleration rates is less than or equal to the threshold value.

If n≥1

$$|\text{Object acceleration rate}_n - (\text{Angular velocity}_{n-1} - \text{Object vector}_{n+1}) - (\text{Angular velocity}_n - \text{Object vector}_n)| \leq \text{Threshold value}_a \quad \text{Expression 10}$$

As the object acceleration rate$_n$, the value computed in S317 is used.

The threshold value$_a$ is a threshold value for determining whether there is a possibility that the object is in a uniformly accelerated motion, and can be set in advance. If it is determined that the expression 10 is satisfied, the CPU 103 advances the process to S316. If it is determined that the expression 10 is not satisfied, the CPU 103 advances the process to S315.

Steps S315 to S318 are the same processes as those of FIG. 4B, and thus descriptions thereof are omitted.

Step S313 is executed when the detected motion vector has been determined as a background vector. In S313, the CPU 103 makes a comparison so as to determine whether the difference between the change amount of the angular velocities and the change amount of the background vectors generated between the previous frame and the current frame is less than or equal to a threshold value by using the expression 3. If it is determined that the expression 3 is satisfied, the CPU 103 advances the process to S1305. If it is determined that the expression 3 is not satisfied, the CPU 103 advances the process to S315. S315 is the same process as that of FIG. 4B, and thus a description thereof is omitted.

The determination that the expression 3 is satisfied is made only when it is possible to determine that there has been no change in the panning state between frames or only the rotational component has changed. In this case, in S1305, the CPU 103 sets the value of the integral flag to 1, and stores therein the fact that it has entered an object vector detection mode (integration mode) for detecting an object vector.

In S1306, the CPU 103 matches the position of the object vector (movement amount) by using the angular velocity of each frame as offset, and integrates the histograms of two frames.

The integration operation performed in S1306 will be described with reference to FIGS. 10A to 10D. If it is assumed that FIG. 10A shows the histogram of the motion vector and the angular velocity of two frames to be integrated, the histogram obtained as a result of integration is as shown in FIG. 10B (the background vector 402 is clipped by the maximum frequency). If the frequency is less than a threshold value 1103 such as a motion vector 1101, it is not possible to detect an object vector and a background vector. However, by integrating the histograms of a plurality of frames, the frequency of a motion vector 1102 after integration increases to greater than the threshold value 1103, and therefore, the motion vector can be treated as an object vector, and as a result, the object velocity can be computed.

However, in the case where a frame having the histogram shown in FIG. 10A and a frame having the histogram shown in FIG. 10C are integrated, the position of the motion vector 1101 does not match, and thus the result of integration is as shown in FIG. 10D. In this case, the frequency of a motion vector 1104 after integration is still less than the threshold value 1103, and thus the motion vector 1104 cannot be treated as an object vector.

In S1307, the CPU 103 updates the processing frame number n by incrementing it by one, and returns the process to S305.

Hereinafter, the object velocity computation process performed in S1308 and the subsequent steps will be described.

In S1308, the CPU 103 determines whether the integral flag is 1, or in other words, the frequency of the motion vector has been integrated. If it is determined that the integral flag is 1, the CPU 103 advances the process to S1309. If the integral flag is 0, the CPU 103 advances the process to S319. S319 to S321 are the same processes as those of FIG. 4A, and thus descriptions thereof are omitted.

Figure 11A:
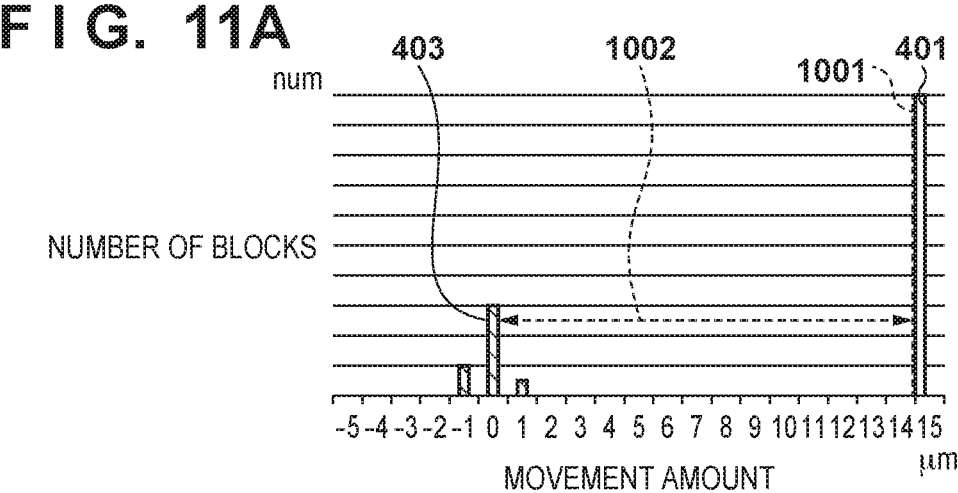
FIGS. 11A to 11E are diagrams illustrating the determination of a panning motion component by using a histogram according to the second embodiment.
Figure 11B:
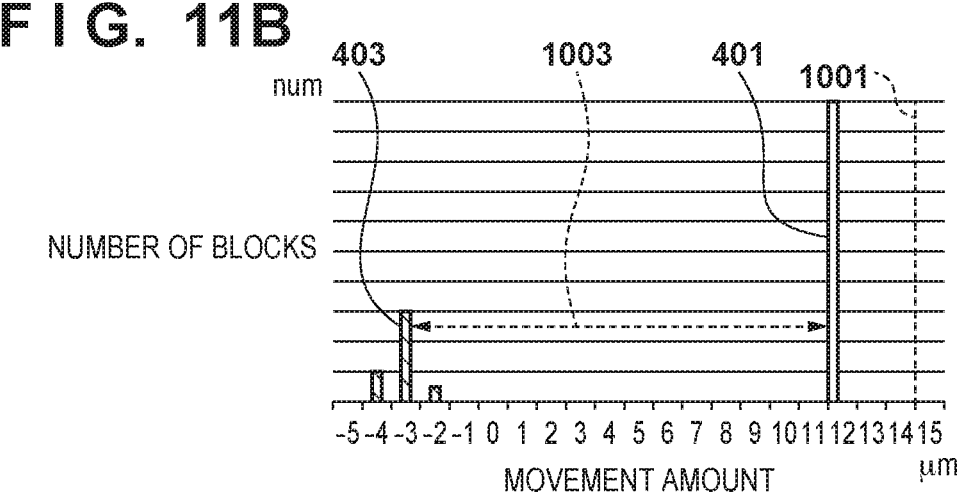
Figure 11C:
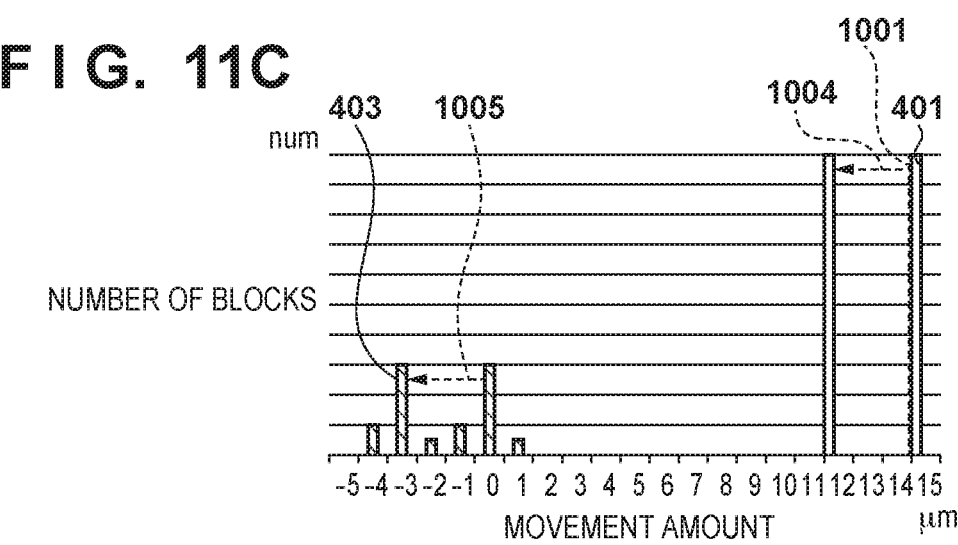

FIGS. 11A to 11E shows examples of histograms when a background vector has not been detected, and 1001 indicates the upper limit of the vector detectable range. In FIGS. 11A and 11B, it is assumed that a difference 1002 between the angular velocity 401 and the object vector 403 converted to the movement amount and a difference 1003 between the same are equal. In this case, as shown in FIG. 11C, a change amount 1004 of the angular velocity 401 and a change amount 1005 of the object vector 403 between FIGS. 11A and 11B are equal. In this case, it is presumed that the object is in a uniform motion, and there has been no change in the panning operation or only the rotational component in the panning operation has changed.

Figure 11D:
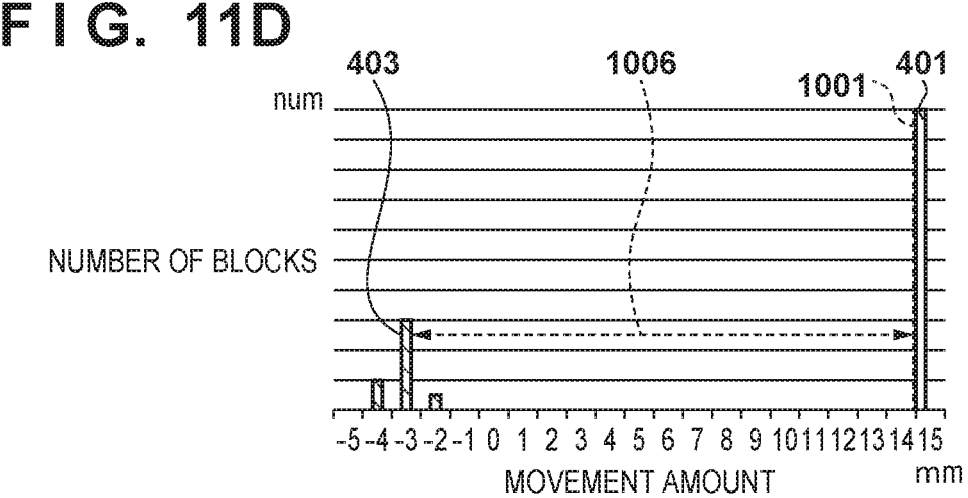
Figure 11E:
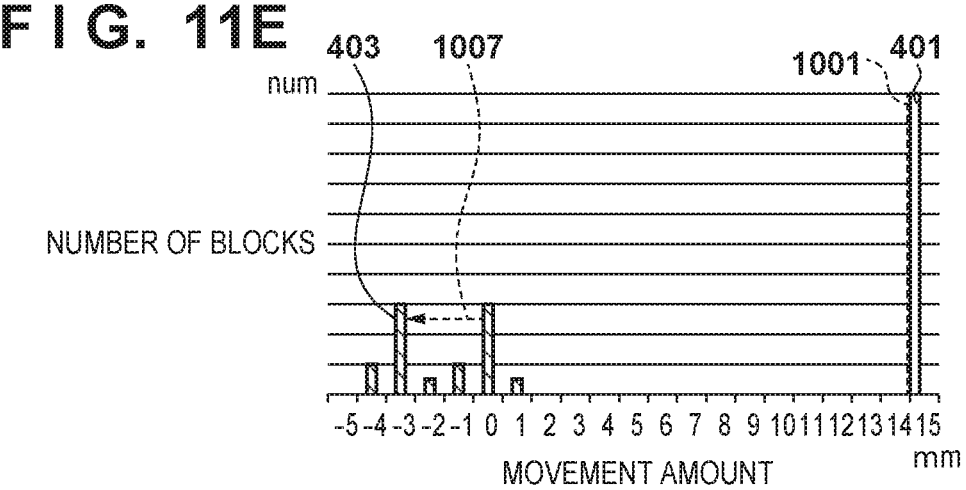

However, there may be a case where the difference 1002 is compared with that having a value different from the difference 1002 such as a difference 1006 between the angular velocity 401 and the object vector 403 converted to the movement amount as shown in FIG. 11D. In this case, as shown in FIG. 11E, the change amount of the angular velocities 401 between FIGS. 11A and 11D is not equal to a change amount 1007 of the object vector 403. In the case where the change amount of the angular velocities 401 and the change amount of the object vectors 403 are not equal, it is difficult to accurately determine that the object velocity has changed or an element other than the rotational component such as the shift component has been added to the panning operation.

In S1309, the CPU 103 sets a motion vector having a maximum frequency other than the background vector as an integral vector.

In S1310, the CPU 103 determines whether or not the frequency of the integral vector set in S1309 is greater than or equal to a threshold value. If it is determined that the frequency of the integral vector is less than the threshold value, the CPU 103 advances the process to S323, and sets the object velocity to 0. By doing so, a normal manual-vibration correction is performed during exposure of the capturing operation.

If, on the other hand, it is determined that the frequency of the integral vector is greater than or equal to the threshold value, the CPU 103 advances the process to S1311, where the CPU 103 decides to treat the integral vector as an object vector, and computes the object angular velocity in S1312.

The CPU 103 computes an object angular velocity $\omega_3$ [rad/sec] by using an expression 11 given below, where the angular velocity at the time of acquiring the current frame (the latest frame) is represented by $\omega_0$ [rad/sec], and the converted value of the angular velocity of the object vector computed from the integral vector is represented by $\omega_1$ [rad/sec].

$$\omega_3 = \omega_0 + \omega_1 \quad \text{Expression 11}$$

If it is determined in S322 that n is less than 1, the CPU 103 advances the process to S1313. If it is determined that n is greater than or equal to 1, the CPU 103 advances the process to S1308.

In S1313, the CPU 103 determines whether the integral flag is 1, or in other words, the frequency of the motion vector has been integrated. If it is determined that the integral flag is 1, the CPU 103 advances the process to S1309. If the integral flag is 0, the CPU 103 advances the process to S323. S323 is the same process as that of FIG. 4A, and thus a description thereof is omitted.

As described above, according to the present embodiment, in addition to the configuration of the first embodiment, a configuration is used in which, if only one motion vector is detected, a determination is made, based on the angular velocity of the image capture apparatus and the motion vectors detected between images, as to whether the detected motion vector is an object vector or a background vector. Accordingly, even if only one motion vector is detected, the same effects as those of the first embodiment can be achieved.

Other Embodiments

In the embodiments given above, a configuration has been described in which the panning assistance and the manual-vibration correction are implemented by driving the shift lens during exposure so as to correct the imaging position of a moving object (change the optical axis). However, it is also possible to implement the present invention by (substantially) changing the optical axis by using other forms such as using a member other than the shift lens such as an optical manual-vibration correction mechanism for driving the image capture element 102, and controlling a clipping position in an electronic manual-vibration correction technique.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-080346, filed on Apr. 9, 2015, which is hereby incorporated by reference herein in its entirety.

What is claimed is:

1. An image capture apparatus comprising:
a processor; and
a memory storing a program which, when executed by the processor, causes the processor to function as the following units:
computation unit configured to compute an object velocity of an object based on a comparison between a change amount of angular velocities detected by a first detection unit configured to detect an angular velocity and a change amount of motion vectors detected by a second detection unit configured to detect motion vectors for each region of an image;
a control unit configured to change an optical axis based on the object velocity during exposure; and
a determination unit configured to determine an object vector and a background vector from among the motion vectors detected by the second detection unit,
wherein the computation unit is configured to determine regularity in motion of the object by using at least one of the change amount of the angular velocities, a change amount of the object vectors, a change amount of difference between the background vectors and the object vectors, and compute the object velocity by a method based on the determination,
wherein the regularity in motion includes a uniform motion and uniformly accelerated motion, and
wherein the computation unit is configured to perform one or more of the following:
if it is determined that the object s in the uniformly accelerated motion, compute the object velocity based on an angular velocity detected by the first detection unit at a time when a latest image is captured and an angular velocity obtained by converting the object vector determined by the determination unit in the latest image; and
if it is determined that the object is in the uniform motion, compute the object velocity based on an angular velocity obtained by converting the object vectors determined by the determination unit in a plurality of images including a latest image.

2. The image capture apparatus according to claim 1, wherein the computation unit is configured to, if a difference between the change amount of the object vectors and the change amount of the background vectors is less than or equal to a pre-set first threshold value, determine that the object is in a uniform motion.

3. The image capture apparatus according to claim 1, wherein the computation unit is configured to, if a change amount of acceleration rates of the object detected based on the change amount of difference between the background vectors and the object vectors is less than or equal to a pre-set second threshold value, determine that the object is in a uniformly accelerated motion.

4. The image capture apparatus according to claim 1, wherein the control unit implements a panning assistance function by changing the optical axis.

5. An image capture apparatus comprising:
a processor; and
a memory storing a program which, When executed by the processor, causes the processor to function as the following units:

a computation unit configured to compute an object velocity of an object based on a comparison between a change amount of angular velocities detected by a first detection unit configured to detect an angular velocity and a change amount of motion vectors detected by a second detection unit configured to detect motion vectors for each region of an image;
a control unit configured to change an optical axis based on the object velocity during exposure; and
a determination unit configured to determine an object vector and a background vector from among the motion vectors detected by the second, detection unit,
wherein the computation unit is configured to determine regularity in motion of the object by using at least one of the change amount of the angular velocities, a change amount of the object vectors, a change amount of the background vectors, a change amount of difference between the background vectors and the object vectors, and compute the object velocity by a method based on the determination,
wherein the regularity in motion includes a uniform lotion and uniformly accelerated motion,
wherein the computation unit is configured to further determine, based on the change amount of the angular velocities and the change amount of the background vectors, whether or not a motion of the image capture apparatus includes a directional component other than a rotational component, and
wherein the computation unit is further configured to perform one or more of the following:
(i) if a difference between the change amount of the angular velocities and the change amount of the background vectors is less than or equal to a pre-set third threshold value, determine that the motion of the image capture apparatus does not include a directional component other than a rotational component; and
(ii) if it is determined that the object is in the uniform motion, compute the object velocity based on an angular velocity obtained by converting the object vectors determined by the determination unit in a plurality of images including a latest image, and wherein the plurality of images do not include an image for which it has been determined that the motion of image capture apparatus includes a directional component other than a rotational component.

6. The image capture apparatus according to claim 5, wherein the control unit implements a panning assistance function by changing it optical axis.

7. An image capture apparatus comprising:
a processor; and
a memory storing a program which, when executed by the processor, causes the processor to function as the following units:
a computation unit configured to compute an object velocity of an object based on a comparison between a change amount of angular velocities detected by a first detection unit configured to detect an angular velocity and a change amount of motion vectors detected by a second detection unit configured to detect motion vectors for each region of an image;
a control unit configured to change an optical axis based on the object velocity during exposure; and
a determination unit configured to determine an object vector and a background vector from among the motion vectors detected by the second detection unit,
wherein the computation unit is configured to determine regularity in motion of the object by using at least one of the change amount of the angular velocities, a change amount of the object vectors, a change amount of the background vectors, and a change amount of difference between the background vectors and the object vectors, and compute the object velocity by a method based on the determination, and wherein when there is one motion vector that is determined as an object vector or a background vector in the motion vectors detected by the second detection unit, the determination unit is configured to perform one or more of the following:

(i) determine the one motion vector as the Object vector if the angular velocity is greater than an upper limit of a pre-set threshold value range and the angular velocity is greater than or equal to an upper limit of a motion vector detectable range, or if the angular velocity is greater than the one motion vector, (ii) determine the one motion vector as the background vector if the angular velocity is greater than an upper limit of a pre-set threshold value range, the angular velocity is not greater than or equal to an upper limit of motion vector detectable range, and the angular velocity is not greater than the one motion vector, (iii) determine the one motion vector as the object vector if an angular velocity at a time when a first image is captured is not greater than an upper limit of a pre-set threshold value range, and an angular velocity at a time when a second image is captured is greater than the pre-set threshold value range, and if a direction of change of the angular velocities and a direction of change of the motion vectors between the first image and the second image are not equal or a change amount of the motion vectors is smaller than a change amount of the angular velocities, and (iv) determine the motion vector as the background vector if an angular velocity at a time when a first image is captured is not greater than an upper limit of a pre-set threshold value range, and an angular velocity at a time when a second image is captured is greater than the pre-set threshold value range, and if a direction of change of the angular velocities and a direction of change of the motion vectors between the first image and the second image are equal, and a change amount of the motion vectors is not smaller than a change amount of the angular velocities.

8. The image capture apparatus according to claim 7, wherein the control unit implements a panning assistance function by changing the optical axis.

9. An image capture apparatus comprising:
a processor; and
a memory storing a program which, when executed by the processor, causes the processor to function as the following units:
a computation unit configured to compute an object velocity of an object based on a comparison between a change amount of angular velocities detected by a first detection unit configured to detect an angular velocity and a change amount of motion vectors detected by a second detection unit configured to detect motion vectors for each region of an image;
a control unit configured to change an optical axis based on the object velocity during exposure; and
a determination unit configured to determine an object vector and a background vector from among the motion vectors detected by the second detection unit,
wherein the computation unit is configured to determine regularity in motion of the object by using at least one of the change amount of the angular velocities, a change amount of the object vectors, a change amount of the background vectors, and a change amount of difference between the background vectors and the object vectors, and compute the object velocity by a method based on the determination, and wherein when there is one motion vector that is determined as an object vector or a background vector in the motion vectors detected by the second detection unit, and the determination unit has determined the one motion vector as the background vector, if a difference between the change amount of the angular velocities and the change amount of the background vectors is less than or equal to a fourth threshold value, the motion vectors detected by the second detection unit are integrated, and a largest motion vector, excluding the background vector, of the integrated motion vectors is used as the object vector.

10. The image capture apparatus according to claim 9, wherein the computation unit is configured to, if the object vector is an integrated motion vector, compute the object velocity based on an angular velocity detected by the first detection unit at a time when a latest image is captured and an angular velocity obtained by converting the object vector.

11. The image capture apparatus according to claim 9, wherein the control unit implements a panning assistance function by changing the optical axis.

12. A control method of an image capture apparatus, the method comprising:
computing an object velocity of an object based on a comparison between a change amount of angular velocities detected by a first detection unit configured to detect an angular velocity and a change amount of motion vectors detected by a second detection unit configured to detect motion vectors for each region of an image;
changing an optical axis based on the object velocity during exposure; and
determining an object vector and a background vector from among the motion vectors detected by the second detection unit,
wherein the computing comprises:
determining regularity in motion of the object by using at least one of the change amount of the angular velocities, a change amount of the object vectors, a change amount of the background vectors, and a change amount of difference between the background vectors and the object vectors; and
computing he object velocity by a method based on the determination,
wherein the regularity in motion includes a uniform motion and a uniformly accelerated motion, and
wherein the computing further comprises one or more of the following:
computing, if it is determined that the object is in the uniformly accelerated motion, the object velocity based on an angular velocity detected by the first detection unit at a time when a latest image is captured and an angular velocity obtained by converting the object vector determines by the determination unit in the latest image; and
computing, if it is determined that the object is in the uniform motion, the object velocity based on an angular velocity obtained by converting the object vectors determined by the determination unit in a plurality of images including a latest image.

13. A control d of an image capture apparatus, the method comprising:

computing an object velocity of an object based on a comparison between a change amount of angular velocities detected by a first detection unit configured to detect an angular velocity and a change amount of motion vectors detected by a second detection unit configured to detect motion vectors for each region of an image;

changing an optical axis based on the object velocity during exposure; and determining an object vector and a background vector from among the motion vectors detected by the second detection unit, wherein the computing comprises:

determining regularity in motion of the object by using at least one of the change amount of the angular velocities, a change amount of the object vectors, a change amount of the background vectors, and a change amount of difference between the background vectors and the object vectors; and computing the object velocity by a method based on the determination, wherein the regularity in motion includes a uniform motion and uniformly accelerated motion, wherein the computing further comprises:

determining, based on the change amount of the angular velocities and the change amount of the background vectors, whether or not a motion of the image capture apparatus includes a directional component other than a rotational component, and wherein the computing further comprises one or more of the following:

(i) determining, if a difference between the change amount of the angular velocities and the change amount of the background vectors is less than or equal to a pre-set third threshold value, that the motion of the image capture apparatus does not include a directional component other than a rotational component; and (ii) computing, if it is determined that the object is in the uniform motion, the object velocity based on an angular velocity obtained by converting the object vectors in a plurality of images including a latest image, and wherein the plurality of images do not include an image for which it has been determined that the motion of image capture apparatus includes a directional component other than a rotational component.

14. A control method of an image capture apparatus, the method comprising:

computing an object velocity of an object based on a comparison between a change amount of angular velocities detected by a first detection unit configured to detect an angular velocity and a change amount of motion vectors detected by a second detection unit configured to detect motion vectors for each region of an image;

changing an optical axis based on the object velocity during exposure; and determining an object vector and a background vector from among the motion vectors detected by the second detection unit, wherein the computing comprises:

determining regularity in motion of the object by using at least one of the change amount of the angular velocities, a change amount of the object vectors, a change amount of the background vectors, and a change amount of difference between the background vectors and the object vectors; and computing the object velocity by a method based on the determination, and wherein when there is one motion vector that is determined as an object vector or a background vector in the motion vectors detected by the second detection unit, the determining an object vector and a background vector comprises one or more of:

(i) determining the one motion vector as the object vector if the angular velocity is greater than an upper limit of a pre-set threshold value range and the angular velocity is greater than or equal to an upper limit of a motion vector detectable range, or if the angular velocity is greater than the one motion vector, (ii) determining the one motion vector as the background vector if the angular velocity is greater than an upper limit of a pre-set threshold value range, the angular velocity is not greater than or equal to an upper limit of a motion vector detectable range, and the angular velocity is not greater than the motion vector, (iii) determining the one motion vector as the object vector if an angular velocity at a time when a first image is captured is not greater than an upper limit of a pre-set threshold value range, and an angular velocity at a time when a second image is captured is greater than the pre-set threshold value range, and if a direction of change of the angular velocities and a direction of change of the motion vectors between the first image and the second image are not equal or a change amount of the motion vectors is smaller than a change amount of the angular velocities, and (iv) determine the motion vector as the background vector if an angular velocity at a time when a first image is captured is not greater than an upper limit of a pre-set threshold value range, and an angular velocity at a time when a second image is captured is greater than the pre-set threshold value range, and if a direction of change of the angular velocities and a direction of change of the motion vectors between the first image and the second image are equal, and a change amount of the motion vectors is not smaller than a change amount of the angular velocities.

15. A control method of an image capture apparatus, the method comprising:

computing an object velocity of an object based on a comparison between a change amount of angular velocities detected by a first detection unit configured to detect an angular velocity and a change amount of motion vectors detected by a second detection unit configured to detect motion vectors for each region of an image;

changing an optical axis based on the object velocity during exposure; and determining an object vector and a background vector from among the motion vectors detected by the second detection unit, wherein the computing comprises:

determining regularity in motion of the object by using at least one of the change amount of the angular velocities, a change amount of the object vectors, a change amount of the background vectors, and a change amount of difference between the background vectors and the object vectors; and computing the object velocity by a method based on the determination, wherein when there is one motion vector that is determined as an object vector or a background vector in the motion vectors detected by the second detection unit, and the one motion vector is determined as the background vector, the control method further comprises:

integrating, if a difference between the change amount of the angular velocities and the change amount of the background vectors is less than or equal to a fourth threshold value, the motion vectors detected by the second detection unit; and using a largest motion vector, excluding the background vector, of the integrated motion vectors as the object vector.

* * * * *